US008164596B1

(12) United States Patent
Bech

(10) Patent No.: US 8,164,596 B1
(45) Date of Patent: Apr. 24, 2012

(54) STYLE SHEET ANIMATION CREATION TOOL WITH TIMELINE INTERFACE

(75) Inventor: Arne Nikolai Bech, San Jose, CA (US)

(73) Assignee: Sencha, Inc., Redwood City, CA (US)

( * ) Notice: Subject to any disclaimer, the term of this patent is extended or adjusted under 35 U.S.C. 154(b) by 0 days.

(21) Appl. No.: 13/267,826

(22) Filed: Oct. 6, 2011

(51) Int. Cl.
*G06T 13/00* (2011.01)
(52) U.S. Cl. .......................... 345/473; 345/475
(58) Field of Classification Search .................... None
See application file for complete search history.

(56) References Cited

U.S. PATENT DOCUMENTS

| 7,620,891 | B2 * | 11/2009 | Aubert et al. | 715/236 |
|---|---|---|---|---|
| 7,996,765 | B1 * | 8/2011 | Mitnick et al. | 715/235 |
| 2005/0144155 | A1 * | 6/2005 | Van Vlimmeren | 707/2 |
| 2006/0005114 | A1 * | 1/2006 | Williamson et al. | 715/502 |
| 2006/0174187 | A1 * | 8/2006 | White et al. | 715/501.1 |
| 2006/0192783 | A1 * | 8/2006 | Kass et al. | 345/473 |
| 2008/0055315 | A1 * | 3/2008 | Ducharme | 345/473 |
| 2009/0228784 | A1 * | 9/2009 | Drieu et al. | 715/235 |

OTHER PUBLICATIONS

"Sencha Animator Debuts: Create Powerful CSS3 Animations for Web Browsers and Mobile Devices" downloaded on Oct. 6, 2011 < http://www.sencha.com/company/press/sencha-animator-debuts-create-powerful-css3-animations-for-web-browsers-and/ > dated Oct. 17, 2010, (2 pages).
"Adobe Edge Preview" downloaded on Oct. 6, 2011 <http://labs.adobe.com/technologies/edge/?sdid=JAXXJ &skwcid=TC|23230|adobe%20edge||S|b|9263245986 > updated Oct. 3, 2011 (7 pages).
"Tumult Hype Create. Animate. HTML5." downloaded on Oct. 6, 2011 < http://tumultco.com/hype/ > 2011 (2 pages).
"Tumult Hype Documentation—Overview" downloaded on Oct. 6, 2011 < http://tumultco.com/hype/documentation/overview/ > 2011 (3 pages).
"Tumult Type Version History" downloaded on Oct. 6, 2011 < http://tumultco.com/hype/documentation/history/ > 2011 (3 pages).
"Animatable" downloaded on Oct. 6, 2011 < http://animatable.com/ > 2011 (1 page).

* cited by examiner

*Primary Examiner* — Daniel Hajnik
(74) *Attorney, Agent, or Firm* — Hickman Palermo Truong & Becker LLP; Adam C. Stone

(57) ABSTRACT

Techniques are provided for automatically creating style sheet animations including keyframe information. In some embodiments, a style sheet animation creation tool with a timeline-based interface is provided. By interacting with the user-interface, the user can select a point on a timeline for an animation object to add a keyframe to an animation of the animation object. In response to the user's selection of the keyframe time point, the style sheet animation creation tool displays an interactive keyframe indicator on the timeline to indicate the selected time point. With the style sheet animation creation tool, a user can generate a style sheet animation without having to author style sheet language text statements by hand.

26 Claims, 19 Drawing Sheets

STYLE SHEET ANIMATION CREATION TOOL WITH TIMELINE INTERFACE

COPYRIGHT STATEMENT

A portion of the disclosure of this patent document and the accompanying drawings contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates to style sheet animations and, more specifically, to techniques for creating style sheet animations.

BACKGROUND

Recently, some web browsers have added support for style sheet animations. Style sheet animations allow a developer of a web browser style sheet to modify style sheet property values over time such that an animated effect is created in a web page when a supporting web browser applies the style sheet to elements of the web page. A developer can create a style sheet animation for a web page by authoring a style sheet according to a particular style sheet language syntax understood by supporting web browsers. One example of a style sheet language syntax for creating style sheet animations currently supported by some widely-used web browsers is known as "CSS3 Animations" which is short for "CSS Animations Module Level 3". See, e.g., the CSS Animations Module Level 3 working draft of Mar. 20, 2009 which is available from the World Wide Web Consortium (www.w3c.org), the disclosure of which is hereby incorporated by reference. The specification is also available on the Internet (e.g., currently at www.w3c.org/TR/2009/WD-css3-animations-20090320/).

Unfortunately, current approaches for developing style sheet animations are at best cumbersome. For example, a developer may create and maintain web browser style sheets "by hand" using a computer-based text editing application. This involves the developer generating and modifying text statements (e.g., lines of text) according to a style sheet language. However, even the simplest of animations in which a single object transitions linearly from one animated state to another may involve creating multiple text statements.

Another drawback to current approaches for developing style sheet animations is that they require the developer to be versed in a style sheet language. For a company or organization seeking to develop a style sheet animation for their web site, a developer with such expertise may be scarce or expensive. Moreover, a user who is not a developer versed in the particulars of a style sheet language or who simply does not want to learn the language may still yet desire to create a style sheet animation. Even for developers who do know a style sheet language, creating and maintaining text statements by hand may be a tedious and repetitive process, especially for more complex style sheet animations which may comprise tens of, hundreds of, or even more text statements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques, mechanisms, and user interfaces for creating style sheet animations using a timeline-based interface are disclosed. In one embodiment, for example, a method performed by a computing device comprises the steps of: displaying a first timeline for a first animation object and in response to obtaining input indicating a first point on the timeline, displaying a first keyframe indicator on the timeline at the first point. The first keyframe indicator represents a first keyframe of an animation of the first animation object. Style sheet language text is automatically generated that declares the first keyframe and that reflects the first point.

In another embodiment, prior to the input, the timeline indicates that the first animation object is not animated. For example, the first timeline may have no keyframe indicators. In response to obtaining the input, a second keyframe indicator is automatically displayed on the timeline at a second point. The second keyframe indicator represents a second keyframe of the animation and forms a keyframe series with the first keyframe. The generated style sheet language text additionally declares the second keyframe and reflects the second point.

In yet another embodiment, prior to the input, the first keyframe indicator and a second keyframe indicator are displayed on the first timeline. The second keyframe indicator is displayed at a second point on the first timeline and represents a second keyframe of the animation. In response to obtaining the input, a third keyframe indicator is displayed on the first timeline at a third point. Third keyframe indicator represents a third keyframe of the animation. The generated style sheet language text additionally declares the second keyframe and the third keyframe and additionally reflects the second point, and the third point.

In still yet another embodiment, in response to obtaining the input, the first keyframe is automatically associated with a default easing function.

In still yet another embodiment, the default easing function is one of ease, linear, ease-in, ease-out, or ease-in-out.

In still yet another embodiment, associating the first keyframe with a default easing function includes associating data that represents the first keyframe with four values that define a cubic Bézier curve.

In still yet another embodiment, the input is caused by a user.

In still yet another embodiment, the first keyframe indicator is interactive. In response to input directed to the first keyframe indicator, a user interface panel is displayed that allows a user to specify a time and an easing function for the first keyframe.

In still yet another embodiment, the style sheet language is a Cascading Style Sheets (CSS)-based style sheet language.

In still yet another embodiment, a second timeline for a second animation object is displayed. A first identifier of the first animation object is displayed in association with the first timeline and a second identifier of the second animation object is displayed in association with the second timeline. The first identifier and the second identifier are displayed with respect to each other in an order that reflects a z-index order of the first animation object with respect to the second animation object. Markup language text and style sheet language text that reflects the z-index order is then automatically generated.

In still yet another embodiment, the first identifier is displayed in a first row with the first timeline and the second identifier is displayed in a second row with the second timeline.

In still yet another embodiment, the first row is displayed closer to an edge of a display than the second row to reflect that the first animation object has a higher z-index order than the second animation object.

In still yet another embodiment, markup language text and style sheet language text is automatically generated which, when processed by a style sheet animation processor, causes the animation of the first animation object to be displayed.

In still yet another embodiment, the style sheet animation processor is a web browser.

In still yet another embodiment, the method further comprises displaying an interactive cubic Bézier curve editor with an animation speed simulator.

In still yet another embodiment, the generated style sheet language text includes timing information for the first keyframe that reflects the first point.

In other aspects, the invention encompasses computing apparatuses and computer readable media configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
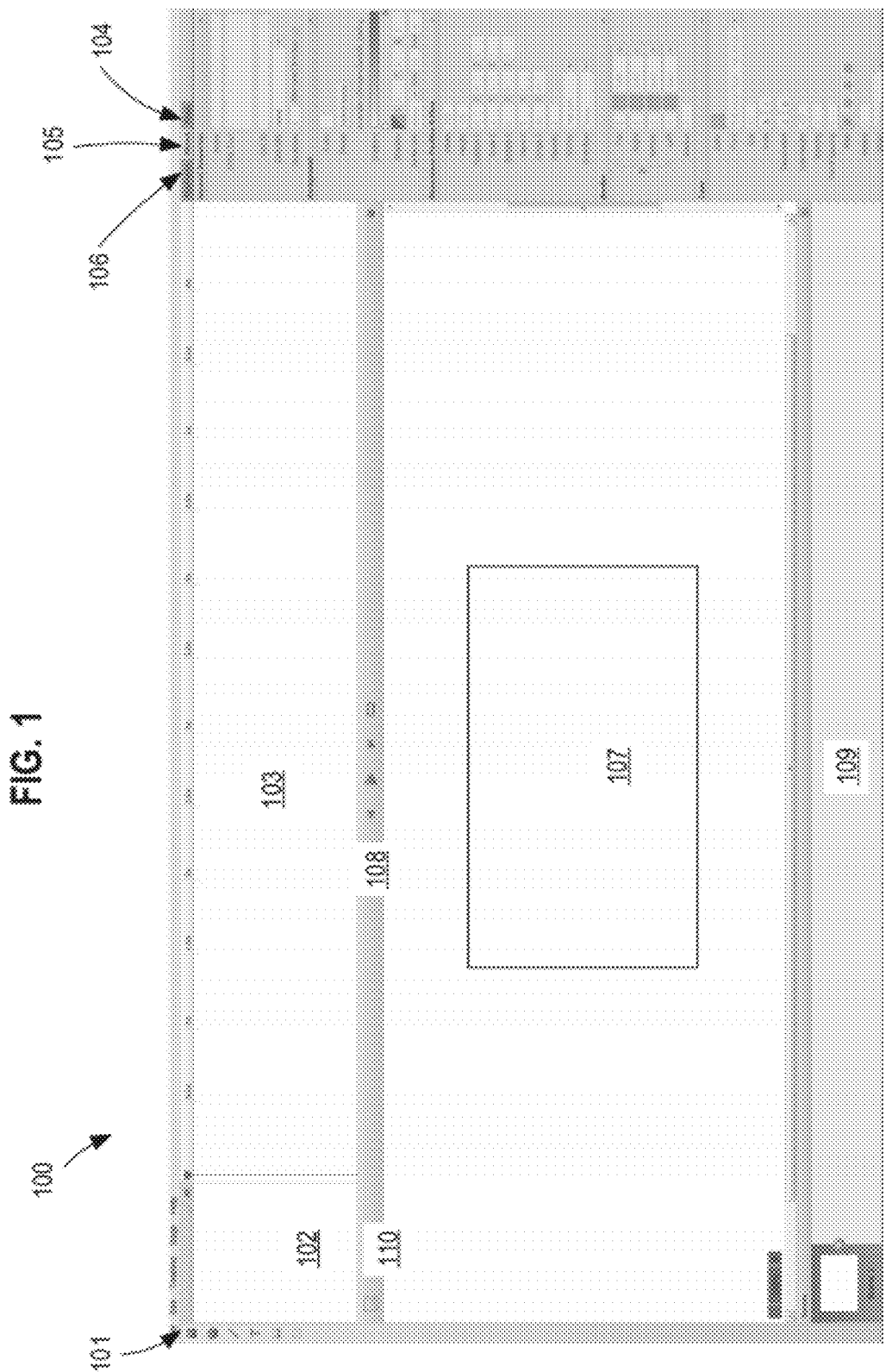
FIG. 1 is a screenshot of an example timeline-based graphical user interface for creating a style sheet animation.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Typically, a file declaring a style sheet animation contains or is associated with "keyframe" information. The keyframe information may reflect, for example, time points during the duration of the animation when particular keyframes are to be displayed and how an animation object (e.g., a box, circle, line, text, image, container, video, etc.) is to visually transition from one keyframe to the next over the animation time period between the two keyframes. Techniques shall be described hereafter for automatically creating style sheet animations including keyframe information. In some embodiments, a style sheet animation creation tool with a timeline-based interface is provided. By interacting with the user-interface, the user can select a point on a timeline for an animation object to add a keyframe to an animation of the animation object. In response to the user's selection of the keyframe time point, the style sheet animation creation tool displays an interactive keyframe indicator on the timeline to indicate the selected time point. With the style sheet animation creation tool, a user can add a keyframe to an animation of an animation object without having to author style sheet language text statements by hand. This is but one feature and benefit of the disclosed the style sheet animation creation tool. This and other beneficial features are described in greater detail below.

Keyframe Information

A style sheet animation may be associated with various forms of keyframe information. A keyframe represents a starting point of a transition to a next keyframe, both a starting point of a transition to a next keyframe and an ending point of a transition from a previous keyframe, or an ending point of a transition from a previous keyframe. A transition is a change in the presentation value(s) of one or more style sheet properties over time. A style sheet animation of an animation object includes or is associated with a duration and further includes or is associated with a keyframe series that includes at least two keyframes.

As an example of keyframe information, consider the following example file contents defining a style sheet animation named "bounce" that has a duration of 5 seconds and that is associated with a keyframe series that includes five keyframes:

01: div {
02: animation-name: 'bounce';
03: animation-duration: 5 s;
04: }

```
05: @keyframes 'bounce' {
06:   0% {
07:     top: 100 px;
08:     animation-timing-function: ease-out;
09:   }
10:   25% {
11:     top: 50 px;
12:     animation-timing-function: ease-in;
13:   }
14:   50% {
15:     top: 100 px;
16:     animation-timing-function: ease-out;
17:   }
18:   75% {
19:     top: 75 px;
20:     animation-timing-function: ease-in;
21:   }
22:   100% {
23:     top: 100 px;
24:   }
25: }
```

In the above example style sheet animation, in the first keyframe (Lines 06-09), the value of the ('top') style sheet property of the animation is 100 pixels (px). The transition from the first keyframe to the second keyframe (Lines 10-13) is ('ease-out') which means that the animation will appear to decelerate over the time between the first keyframe and the second keyframe. By 25% of the animation duration, the ('top') value has animated to 50 pixels. The transition from the second keyframe to the third keyframe (lines 14-17) is ('ease-in') which means that the animation will appear to accelerate over the time between the second keyframe and the third keyframe. At 50% of the animation duration, the ('top') value has animated back to 100 pixels. The transition between the third keyframe and the fourth keyframe (Lines 18-21) is ('ease-out'). At 75% of the animation duration, the ('top') value has animated to 75 pixels. The transition from fourth keyframe to the fifth keyframe (Lines 22-24) is ('ease-in'). At the end of the animation cycle, the ('left') value has returned to 100 pixels.

The above is merely one example of keyframe information that may be automatically created by the style sheet animation creation tool disclosed herein. Other types of keyframe information that may be automatically created include animation iteration count information, animation direction information, animation play state information, animation delay information, animation event information, or any other type of information used to define or that is associated with a style sheet animation. The techniques described herein are not limited to any particular type of keyframe information.

In addition, the techniques described hereafter may be employed to automatically create a complete web page that that contains a style sheet animation including keyframe information. For example, in some embodiments, after the user has constructed a style sheet animation using the style sheet animation creation tool, the tool creates a markup language document (e.g., a HTML document, an XHTML document, etc.) that contains executable instructions including keyframe information which, when processed by a style sheet animation processor (e.g., a web browser), causes the processor to animate the style sheet animation in accordance with the instructions. Thus, with the disclosed style sheet animation creation tool, a user can create a web page that includes a style sheet animation without having to author by hand (e.g., type) a single markup language or style sheet language text statement.

Timeline-Based Interface

According to some embodiments, a user is presented with an interface that represents a timeline. Through interaction with the user interface, the user may, among other operations, add and configure keyframes for animations of animation objects as part of a process for creating an overall style sheet animation. Before describing these and other operations that may be carried out through the timeline-based interface, an overview of an example timeline-based interface for creating style sheet animations will now be described.

FIG. 1 is a screenshot of an example timeline-based graphical user interface 100 for creating a style sheet animation. Interface 100 includes an interactive animation object toolbar 101 for adding a new animation object to the style sheet animation. Animation objects added to the style sheet animation are displayed in the interactive animation object area 102. The interface 100 further includes an interactive timeline area 103 for adding keyframes to animations of animation objects, deleting keyframes from animations, and displaying and configuring keyframes added to animations.

The stage area 107 represents the area of the web page on which the style sheet animation will be displayed. The stage tab 104 allows the user to adjust the size, background color and border color of the stage area 107. The object tab 105 is for adjusting properties of a currently selected animation object. The keyframe tab 106 allows the user to specify properties of a currently selected keyframe. The stage controls 108 allow the user to jump to the beginning of the style sheet animation, play a preview of the style sheet animation in the stage area 107, jump to the end of the style sheet animation, and continuously loop playback of the style sheet animation.

The user interface 100 also includes an overflow control 110 for enabling and disabling stage overflow (e.g., whether animation objects outside of the stage dimensions are visible or hidden).

The interface 100 provides a scene manager 109 for chaining individual style sheet animations together to create a longer style sheet animation.

These and other user interface elements may be included in a user interface of the style sheet animation creation tool. These and other user interface will now be described in greater detail with respect to style sheet animation creation operations that may be carried out by a user using the user interface 100.

Adding Animation Objects to a Style Sheet Animation

Figure 2:
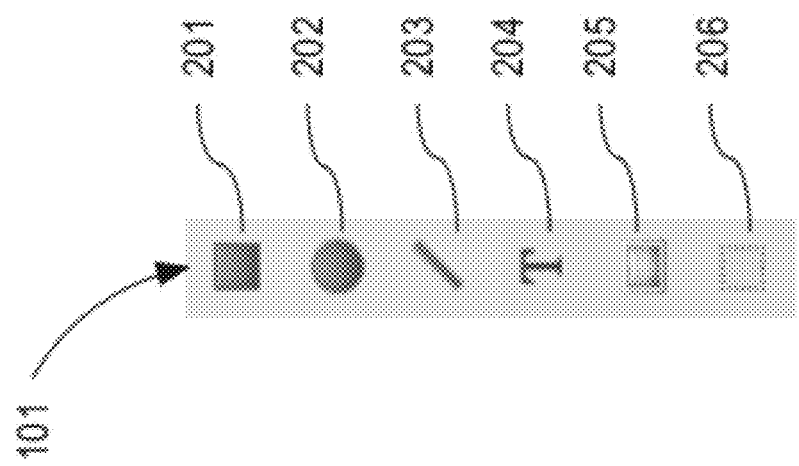
FIG. 2 is a screenshot of an example user interface toolbar for adding new animation objects to a style sheet animation.

FIG. 2 is a screenshot of the animation object toolbar 101 of FIG. 1. A user can add new animation objects to a style sheet animation by directing input (e.g., a mouse click) to an animation object icon 201-206 of the object toolbar 101.

An animation object icon 201-206 that is selected on the toolbar 101 may cause a new corresponding animation object to be added to the top of an animation object tree displayed in the object area 102. An example animation object tree is described in greater detail below with respect to FIG. 3. For example, by clicking or double-clicking on an animation object icon 201-206 on the toolbar 101, a default name for the corresponding animation object may appear at the top of the object tree displayed in the object area 102.

Alternatively, if an animation object is currently selected in the object area 102, then a new animation object selected from the toolbar 101 may be added as a sibling of the currently selected object. This is useful if the currently selected animation object is a nested animation object and thus, has a parent animation object. Nesting animation objects is described in greater detail below.

In some embodiments, a user can interact with the toolbar 101 to add the following types of animation objects to a style sheet animation:
1. Box
2. Circle
3. Line
4. Text
5. Image
6. Container In the example interface of FIG. 2, icons 201-206 are interactive. Input may be directed to one of the icons 201-206 to add a corresponding animation object to the style sheet animation. In particular, icon 201 is for adding a new Box animation object, icon 202 for adding a new Circle animation object, icon 203 for adding a new Line animation object, icon 204 for adding a new Text animation object, icon 205 for adding a new Image animation object, and icon 206 for adding a new Container animation object. These and other types of animation objects may be added to a style sheet animation. For example, in addition to or instead of some or all of the animation objects presented in FIG. 2, the toolbar 101 may allow the user to add other types of animation objects such as a video animation object, a three-dimensional animation object, or any other type of object that can be animated by a style sheet animation.

In some embodiments, the style sheet animation creation tool, when creating a web page for the style sheet animation, represents an animation object as HyperText Markup Language (HTML) divisions ('<div> . . . </div>') in a markup language document representing the web page. The division has a different initial style sheet style applied depending on the type of the animation object. Of course, the initial style sheet style applied to the animation object, and in particular the values of the style sheet properties thereof, may be changed by a web browser when animating the object.

In some embodiments, the initial style sheet style applied to an animation object corresponds to the animated state of the animation object at the first keyframe of the animation object. As an example, the style sheet animation creation tool may generate the following markup language and style sheet language text to represent the initial animated state of a circle with a radius of 50 pixels positioned at the top left corner of the web page:
01: <!DOCTYPE html>
02: <html>
03: <head>
04: <meta http-equiv="Content-Type" content="text/html; charset=utf-8">
05: <style type="text/css">
06: #mycircle {
07: width: 100 px;
08: height: 100 px;
09: border-top: 1 px solid;
10: border-right: 1 px solid;
11: border-bottom: 1 px solid;
12: border-left: 1 px solid;
13: border-radius: 50 px;
14: top:0;
15: left:0;
16: }
17: </style>
18: </head>
19: <body>
20: <div id="mycircle"></div>
21: </body>
22: </html>

In some embodiments, the style sheet animation creation tool, when creating a web page for the style sheet animation, represents an animation object as HyperText Markup Language (HTML) division ('<div> . . . </div>') but with additional HTML markup nested inside the division tag. For example, in the following markup language text represents an Image animation object:
<html>
. . .
<div id="myimage"><img src="[path to image]"></img></div>
. . .
</html>

Viewing and Setting Z-Index Ordering

According to some embodiments, the animation objects added to the style sheet animation are listed in an order in the object area 102 and this order determines the z-index order of the animation objects for the style sheet animation. The z-index order of an animation object determines whether the animation object is positioned in front or behind of another animation object when the positions of the two animation objects overlap each other during the animation. By observing the current listed order of the animation objects in the object area 102, the user can easily determine the current z-index ordering of animation objects added to the style sheet animation.

In some embodiments, the animation objects currently added to the style sheet animation are arranged in the object area 102 as a tree. The tree representation is used to convey any nesting relationships between animation objects. As will be explained in greater detail below, multiple animation objects can be logically grouped together by the user through parent-child relationships to allow the user to configure animation properties of multiple animation objects as a group.

Figure 3:
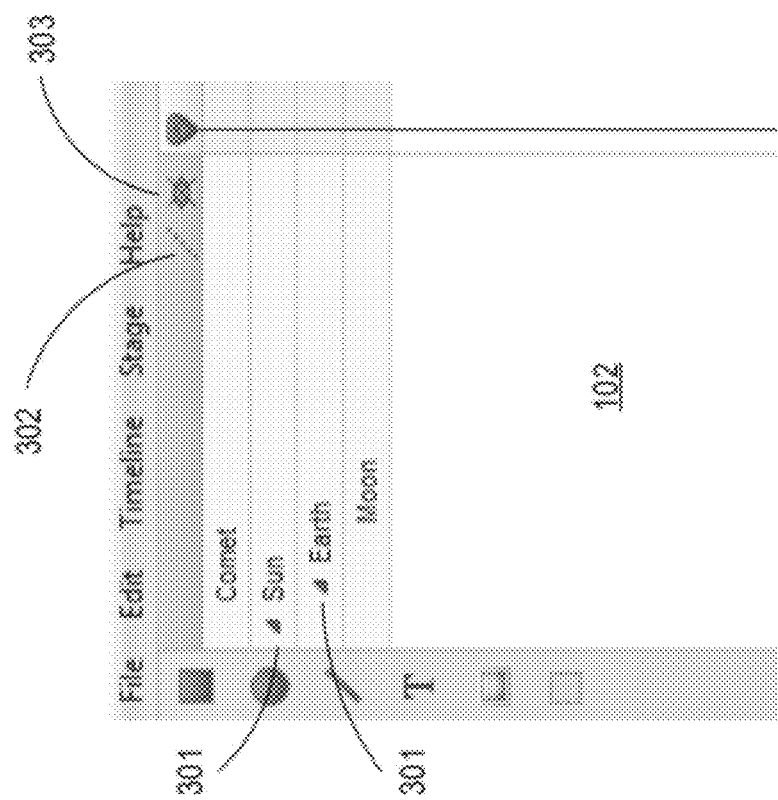
FIG. 3 is a screenshot of an example user interface in which animation objects added to a style sheet animation are arranged as a tree.

FIG. 3 is a screenshot of an example animation object area 102 in which animation objects added to a style sheet animation are arranged as a tree. In this example, four animation objects are currently added to the style sheet animation named "Comet", "Sun", "Earth", and "Moon". At the top of the tree is the animation object named "Comet". At the bottom is the animation object named "Moon". The "Earth" and "Moon" animation objects are nested. In particular, the "Moon" animation object is nested within the "Earth" animation object which is in turn nested within the "Sun" animation object.

A nesting relationship between animation objects in the object area 102 tree may also be considered a parent-child relationship. For example, the "Moon" animation object is a child of the "Earth" animation object which is the parent of the "Moon" animation object and also a child of the "Sun" animation object which is the parent of the "Earth" animation object. Interactive collapse/expand triangles 301 appear next to an identifier of an animation object in the object area 102 tree if the animation object has any descendant animation objects (i.e. at least one child animation object).

With respect to z-index ordering, according to some embodiments, an animation object that is a sibling of another animation object (i.e. both animation objects have no parent or share the same parent animation object) has a greater z-index order that its sibling if it is positioned closer to the top of the object area 102 tree than its sibling. For example, a user can easily determine by glancing at object area 102 that the "Comet" animation object has a higher z-index order than the "Sun" animation object because the "Comet" animation is positioned closer to the top of the object area 102 tree than the "Sun" animation object. In other words, the user can quickly determine that the "Comet" animation will appear in front of the "Sun" animation object if the two objects overlap during the style sheet animation that is based on this ordering.

In some embodiments, an animation object and all of its descendants all have greater z-index orders than any lower positioned sibling animation object and any and all of its descendants. For example, the "Comet" animation object has a greater z-index order than all of the "Sun", "Earth", and "Moon" animation objects because the "Comet" animation is positioned closer to the top of the object area 102 tree than the sibling "Sun" animation object and because the "Earth" and "Moon" animation objects are descendants of the "Sun" animation object. If the "Comet" animation object had a descendant animation object, then that descendant animation object would also have a greater z-index order than all of the "Sun", "Earth", and "Moon" animation objects.

In some embodiments, a child animation object has a greater z-index order than its parent. For example, the "Moon" animation object has a greater z-index order than the "Earth" animation object which has a greater z-index order than the "Sun" animation object. The reverse is also possible such that the "Moon" animation object has a lesser z-index order than "Earth" animation object which in turn has a lesser z-index order than the "Sun" animation object. However, because the "Comet" animation is positioned closer to the top of the object area 102 tree than the sibling "Sun" animation object and because the "Earth" and "Moon" animation objects are descendants of the "Sun" animation object, in no case would any of the "Sun", "Earth", and "Moon" animation objects have a greater z-index order than the z-index order of "Comet" animation object or the z-index orders of any descendants of the "Comet" animation object.

The current z-index ordering for animation objects listed in the object area 102 can be easily changed by the user through the interface 100, for example, by clicking, dragging, and releasing a selected animation object identifier in the object area 102 to move the animation object up or down in the listed order.

As mentioned previously, a user can add a new animation object to the object area 102 tree from the animation object toolbar 101. In some embodiments, once the new animation object has been added to the object area 102 tree, a number of actions can be performed on it including, for example:

Reordering the animation object in the object area 102 tree by dragging it from its current location in the tree and dropping it in a new location.

Nesting the animation object inside another animation object by dragging the animation object from its current location and dropping it onto the other animation object.

Un-nesting the animation object by dragging it from its current location to the top or bottom of the object area 102 tree.

Collapsing or expanding the animation object by clicking on the expander triangle 301 beside the animation object in the object area 102, if the animation object has descendants.

Selecting the animation object by clicking on the animation object at its position in the object area 102 tree.

Removing the animation object from the style sheet animation by selecting the animation object and pressing the "Delete" or "Backspace" key or other suitable key.

Toggling Display of Movement Paths

The object area 102 may also include a movement path display toggle which toggles the display of movement paths in the stage area 107 for selected animation objects. A movement path is a graphical representation of positional transitions between keyframes of an animation object.

Figure 4:
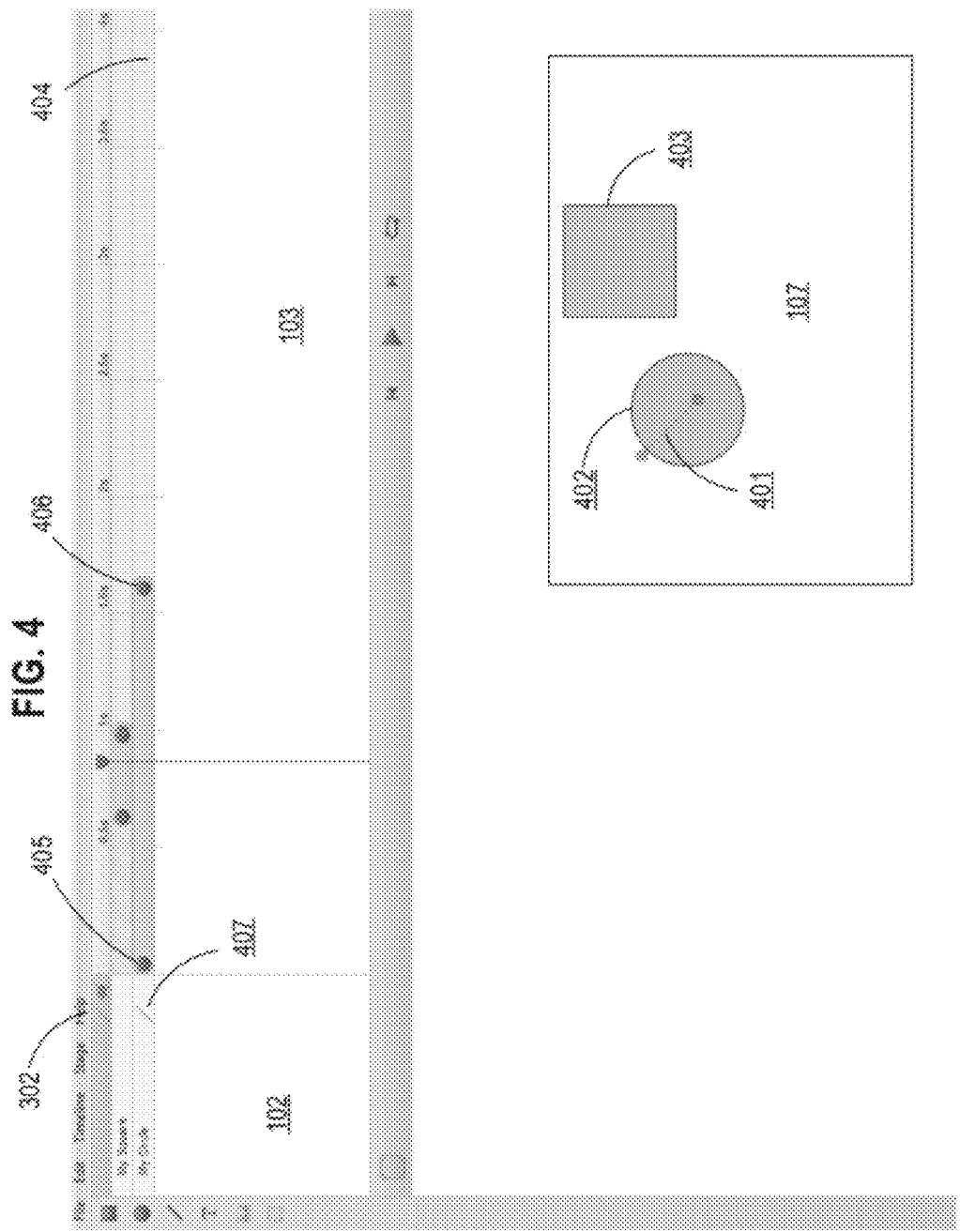
FIG. 4 is a screenshot of an example user interface for toggling display of movement paths.

According to some embodiments, a user can toggle the display of movement paths for an animation object by clicking beside the animation object in the object area 102 underneath the movement path toggle icon 302. For example, in FIG. 4, the user has selected to display movement paths for the "My Circle" animation object 402 but not for the "My Square" animation object 403. The movement path 401 represents the position transition from a first keyframe for the "My Circle" animation object 402 to a second keyframe for the for the "My Circle" animation object 402. The first keyframe for the "My Circle" animation object is represented on the animation object timeline 404 for the "My Circle" animation object 402 by interactive keyframe indicator 405. The second keyframe for the "My Circle" animation object 402 is represented on the animation object timeline 404 for the "My Circle" animation object 402 by interactive keyframe indicator 406. An interactive movement path indicator 407 is displayed beside "My Circle" in the object area 102 to indicate that movement paths for the "My Circle" animation object 402 are currently being displayed. The user can select (e.g., click) the interactive movement path indicator 407 to stop displaying movement paths (i.e., movement path 401) for the "My Circle" animation object 402.

Toggling Display of Animation Objects

Returning to FIG. 3, the object area 102 may also include an animation object display toggle which toggles the display of selected animation objects in the stage area 107. This may be useful to the user to hide the display of some of the animation objects of a style sheet animation (i.e., reduce visible clutter of the stage area 107) so as to be able to better focus on and more easily configure other animation objects of the style sheet animation.

Figure 5:
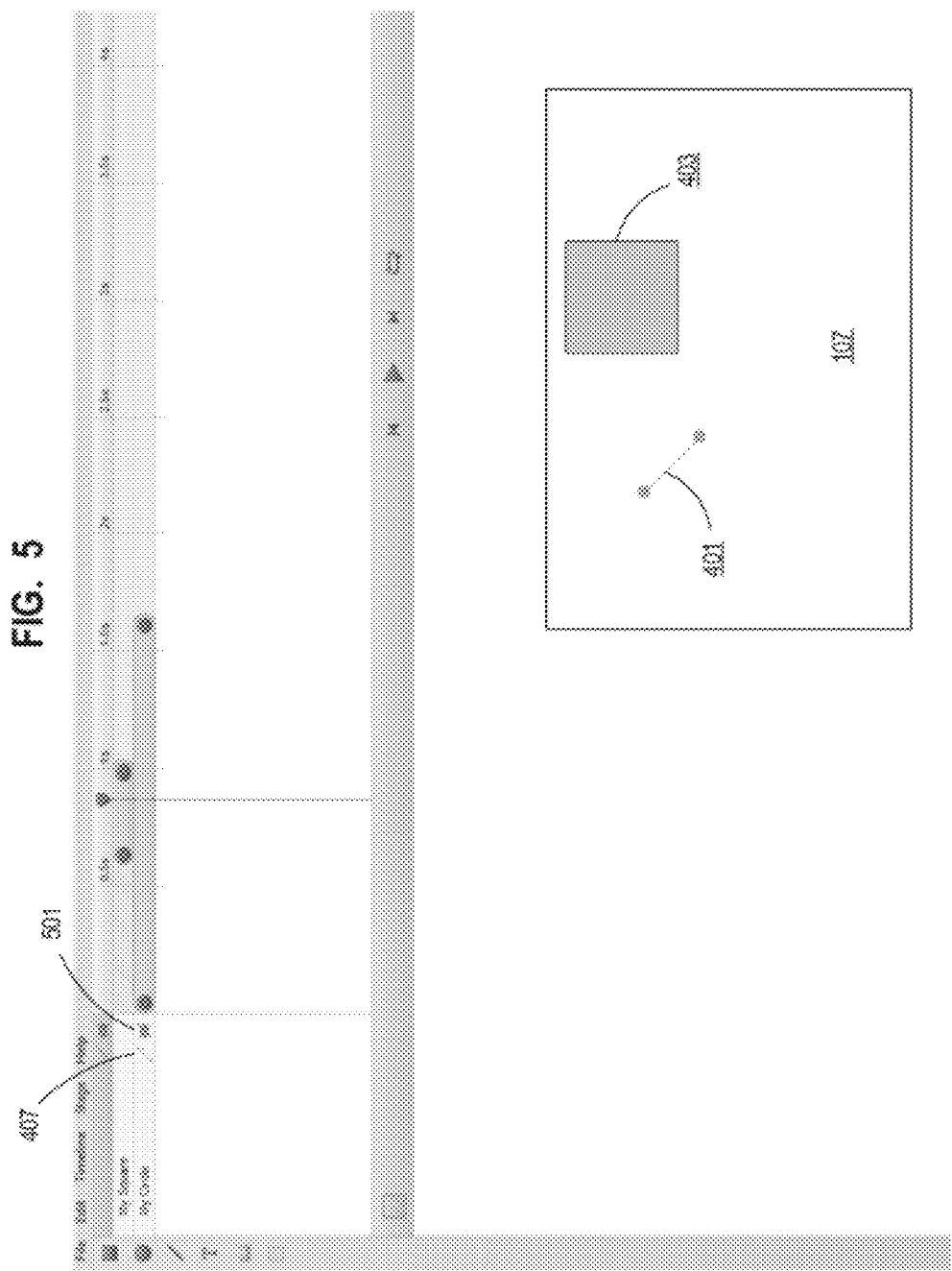
FIG. 5 is a screenshot of an example user interface for hiding and un-hiding display of animation objects.

According to some embodiments, a user can toggle the display of an animation object by clicking beside the animation object in the object area 102 underneath the animation object toggle icon 303. For example, in FIG. 5, the user has selected to hide the "My Circle" animation object 402 but not the "My Square" animation object 403. An interactive animation object display toggle icon 501 is displayed beside "My Circle" in the object area 102 to indicate that the "My Circle" animation object 402 is currently being hidden. The movement path 401 for the "My Circle" animation object 402 is still displayed in accordance with the activation of movement path display toggle 407. The user can select (e.g., click) the interactive animation object display toggle icon 501 to unhide display of the "My Circle" animation object 402. It should be noted that hiding display of an animation object through animation object display toggle merely hides the display of the animation object on the stage area 107 and does not permanently remove the animation object from the style sheet animation.

Configuring Keyframes for an Animation of an Animation Object

According to some embodiments, each animation object added to a style sheet animation has its own separate interactive animation object timeline in the timeline area 103. The user may interact with the timeline for an animation object to configure keyframes and keyframe transitions for an animation of the animation object. For example, in FIG. 6, the "My Square" animation object has its own separate timeline 404A and the "My Circle" animation object has its own separate timeline 404B.

Figure 6:
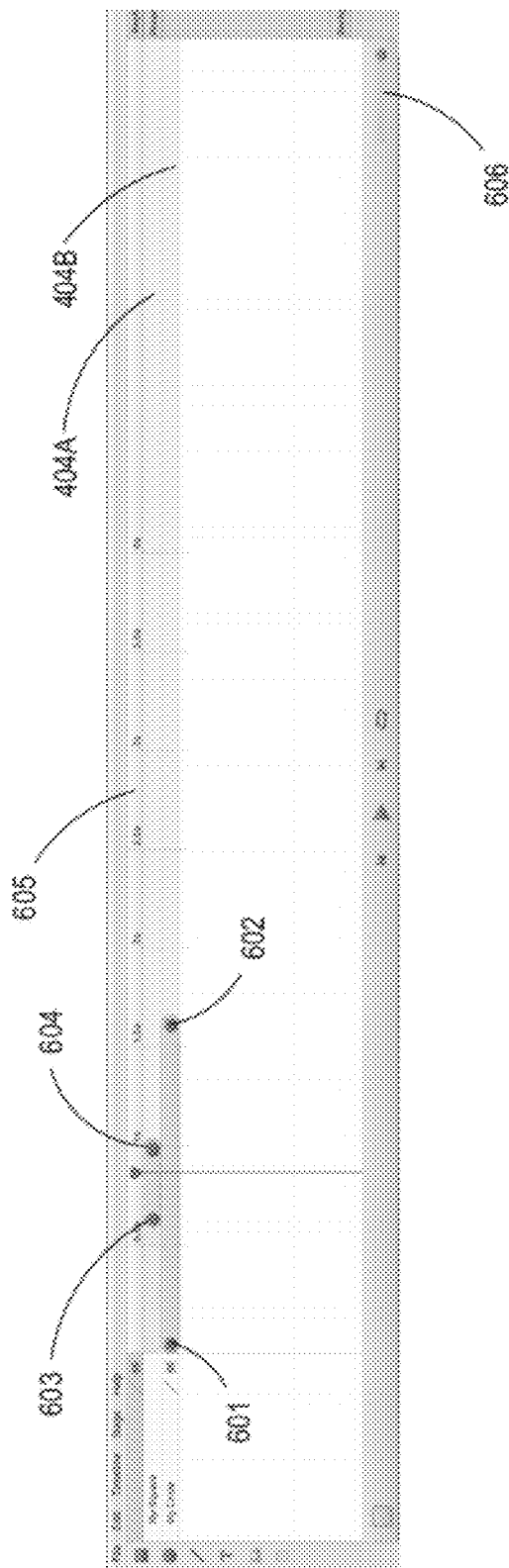
FIG. 6 is a screenshot of an example user interface for configuring keyframes.

In the embodiment of FIG. 6, the indication of an animation object added to the style sheet animation in the object area 102 is aligned in a row with its corresponding animation object timeline. If an animation object is reordered in the object area 102, the timeline for the animation object is also reordered in the timeline area 103 such that the row correspondence between the animation object and its timeline is maintained. While in the embodiment of FIG. 6, correspondence between an animation object and its timeline is visibly conveyed by aligning in a row on the interface 100 the indication of the animation object in the object area 102 with the animation object's timeline in the timeline area 103, other techniques for conveying the correspondence may be used and the present invention is not limited to the row correspondence technique of FIG. 6. For example, correspondence between an animation object and its timeline may be visibly conveyed by aligning an indication of the animation object and its timeline in a column.

Creating an Initial Keyframe Series

The timeline area 103 for a new style sheet animation is initially empty. To add an initial keyframe series to an animation object, the user may direct input (e.g. by clicking or double-clicking) to anywhere in that animation object's timeline 404. A keyframe series is a series of more than one keyframe. A keyframe series has at least one transition between two consecutive keyframes in the series. A keyframes series of an animation object represents an animation of the animation object.

In the example of FIG. 6, there are two initial keyframes series. One keyframe series for the "My Square" animation object and another keyframe series the "My Circle" animation object. The keyframe series for the "My Square" animation object is indicated by interactive keyframe indicators 603 and 604. The visible band on timeline 404A between indicators 603 and 604 represents the animation transition between the keyframe of the animation of the "My Square" animation object represented by indicator 603 and the keyframe represented by indicator 604. Similarly, the keyframe series for the "My Circle" animation object is indicated by interactive keyframe indicators 601 and 602. The visible band on timeline 404B between indicators 601 and 602 represents the animation transition between the keyframe of the animation of the "My Circle" animation object represented by indicator 601 and the keyframe represented by indicator 602.

As mentioned, to create an initial keyframe series for an animation object, the user may direct input (e.g. by clicking or double-clicking) to anywhere in that animation object's timeline 404. For example, to create the initial keyframe series 601, 602 for the "My Circle" animation object, the user may select a point on the timeline 404B corresponding to the location of indicator 602. In response to user's selection, the keyframe series 601, 602 is automatically created. In particular, in addition to the keyframe corresponding to indicator 602, the keyframe corresponding to indicator 601 is automatically created in response to the user's selection of the point for indicator 602 so as to form the keyframe series 601, 602.

In some embodiments, this automatically created keyframe is initially associated with the start time of the style sheet animation (e.g., time zero). In some embodiments, this automatically created keyframe is also associated with a default easing function that controls the speed of the animation between this keyframe (e.g., keyframe corresponding to indicator 601) and the other keyframe (e.g., the keyframe corresponding to indicator 602) of the initial keyframe series. Easing functions are described in greater detail below. Thus, with a single click or double-click, for example, the user can create an initial keyframe series (i.e., an animation) for an animation object. In the example of FIG. 6, the keyframe series 603, 604 has been moved down the timeline 404A after it was initially created.

Timeline Scale

As shown in FIG. 6, the timeline area 103 includes a timeline scale 605. The timeline scale 605 indicates the overall duration of the style sheet animation, the time points during the overall duration at which keyframes are reached, the duration of transitions between keyframes, and the start and end times during the overall duration of keyframe series.

In one embodiment, the overall duration of the style sheet animation is indicated by the latest keyframe of all keyframes of all animation objects added to the style sheet animation. For example, in FIG. 6, the time scale 605 and indicator 602 indicates that the overall duration of the style sheet animation is between 1.5 and 2 seconds. This is also the time length of the keyframe series 601, 602. The duration of the keyframe series 603, 604 is less than half a second. The keyframe series 603, 604 starts after 0.5 seconds after the style sheet animation has started and ends just before 1 second into the style sheet animation.

The interface 100 may also include a timeline scale adjuster 606 for changing the length of the discrete time units of the scale 605. In the example of FIG. 6, the length of the discrete time units of the scale 605 is 0.5 seconds.

Figure 7:
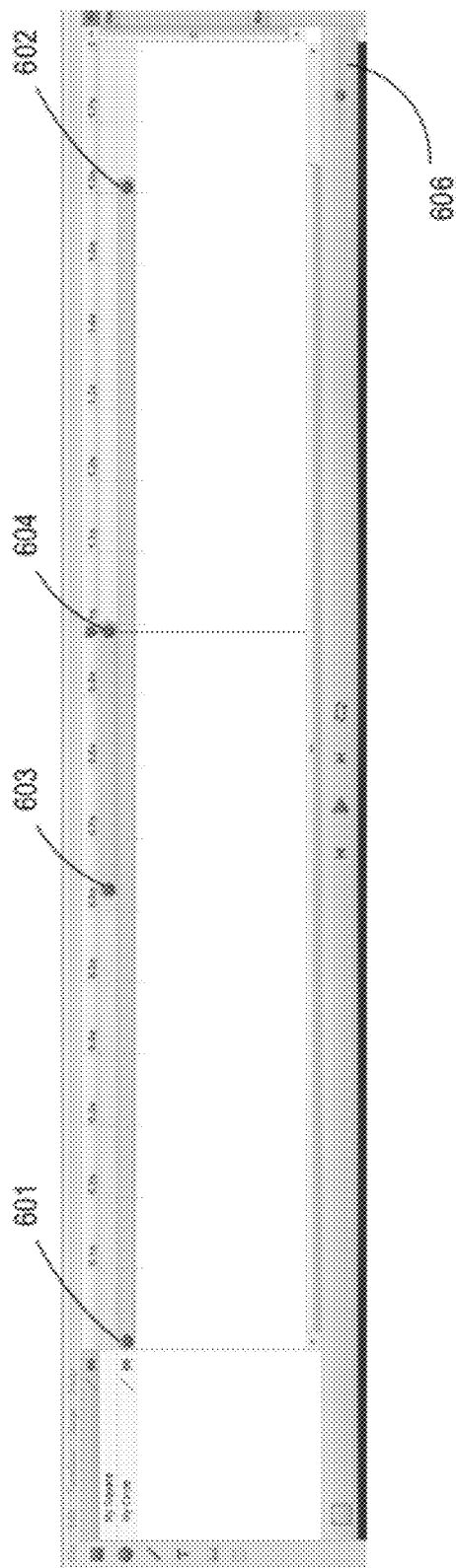
FIG. 7 is a screenshot of an example user interface for configuring keyframes.

In FIG. 7, input to the adjuster 606 caused the length of the discrete time units of the scale 605 to change to 0.1 seconds. As a result, the displayed length of the keyframe series 601, 602 and series 603, 604 expanded to accurately reflect the durations of the keyframe series with respect to the new shorter time scale 605 units. It should be noted that input to the adjuster 606 to change the length of the time scale 605 units does not affect the timing of keyframes or the timing of the style sheet animation. For example, as shown in FIG. 6 and FIG. 7, the overall duration of the style sheet animation and the start times and end times of the keyframe series 601, 602 and series 603, 604 are the same before and after the time scale adjustment.

Other Timeline Operations

According to some embodiments, once an initial keyframe series has been established for animation object, the user can perform various operations including:

Moving the entire keyframe series to start earlier or later during the style sheet animation by directing input to an empty area within the keyframe series (e.g., between two keyframe indicators of the keyframe series) and dragging the series up or down the timeline.

In some embodiments in which this move operation is performed on a collapsed animation object that has descendent animation objects in the object area 102 tree, the keyframe series for the collapsed animation object and all of its descendent animation objects are moved by the same amount. If the animation object with descendents is not collapsed in the object area 102 (i.e., it is expanded), then only the selected keyframe series for the expanded animation object is moved.

Adding additional keyframes to a keyframe series by directing input to a location in the corresponding animation object's timeline after the first keyframe in the series where a keyframe indicator does not already exist.

Figure 8:
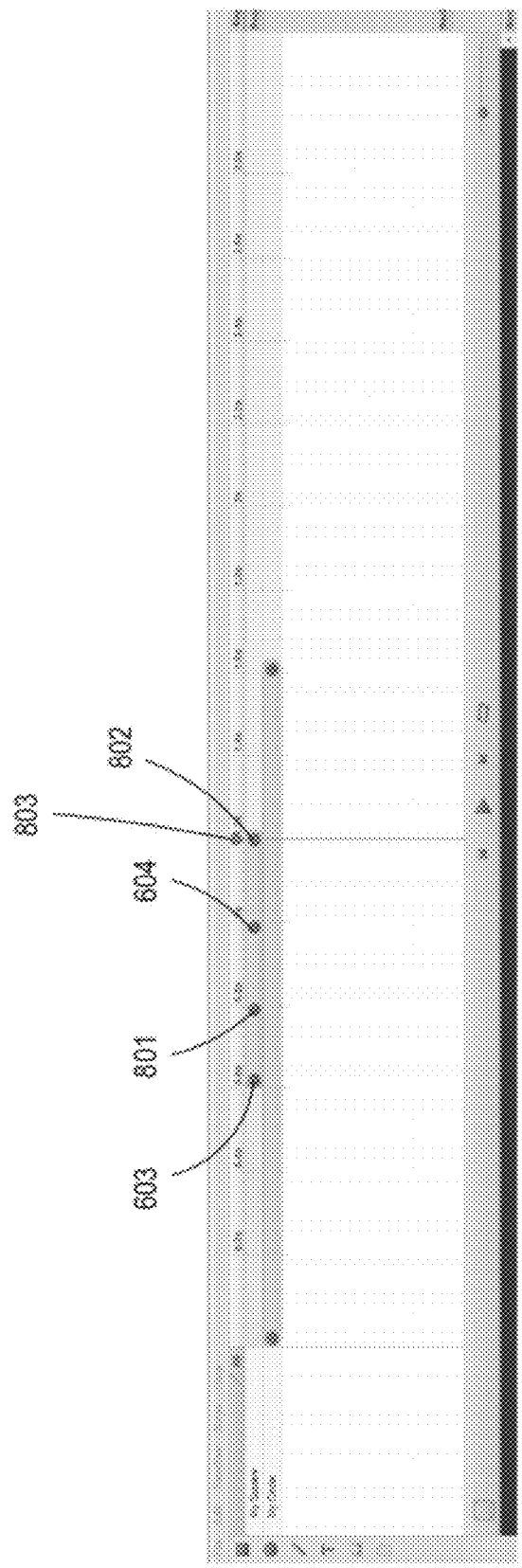
FIG. 8 is a screenshot of an example user interface for configuring keyframes.

For example, in FIG. 8, two new keyframes have been added to the initial keyframe series 603, 604 for the "My Square" animation object to form the new keyframe series 603, 801, 604, 802. In particular, a new keyframe represented by keyframe indicator 801 has been added to the animation of the "My Square" animation object between the existing keyframe corresponding to indicator 603 and the existing keyframe corresponding to indicator 604.

In one embodiment, in response to the input to add the new keyframe corresponding to keyframe indicator 801, the existing easing function associated with the keyframe corresponding to indicator 603 now controls the speed of the animation between the keyframe of indicator 604 and the keyframe of indicator 801, where prior to the input, that easing function controlled the speed of the animation between the keyframe of indicator 603 and the keyframe of indicator 604. Also in response to this input, the keyframe of indicator 801 is associated with a default easing function that controls the speed of the animation between this keyframe and the keyframe of indicator 604. In an alternative embodiment, in response to this input, the easing function of keyframe 601 is copied to the keyframe of indicator 801 such that the speed of the animation between the keyframes of indicators 601 and 801 and the speed of the animation between the keyframes of indicators 801 and 604 are controlled by the same easing function.

After a keyframe is added to an animation for animation object (i.e., part of a keyframe series for the animation object), the user can change the easing function configuration for the keyframe using the keyframe tab 106 as described below.

In FIG. 8, another keyframe indicated by keyframe indicator 802 has been added after the existing keyframe corresponding to indicator 604. In response to the input to add the new keyframe corresponding to keyframe indicator 802, the existing keyframe corresponding to indicator 604 may be associated with a default easing function that controls the speed of the animation of the "My Square" animation object between this existing keyframe and the just added keyframe corresponding to indicator 802.

Deleting an individual keyframe from a keyframe series by directing input to the corresponding keyframe indicator (e.g., clicking on the keyframe indicator) and subsequently hitting the "Delete", "Backspace", or equivalent key.

Moving an individual keyframe to a point in time earlier or later in the animation for the animation object by clicking and dragging the corresponding keyframe indicator up or down the corresponding animation object's timeline.

Additionally, the user can drag the playhead 803 up or down the timeline area 103 to view the style sheet animation in the stage area 107 at a particular point in time of the animation.

These and other operations may be performed.

The Stage

Figure 9:
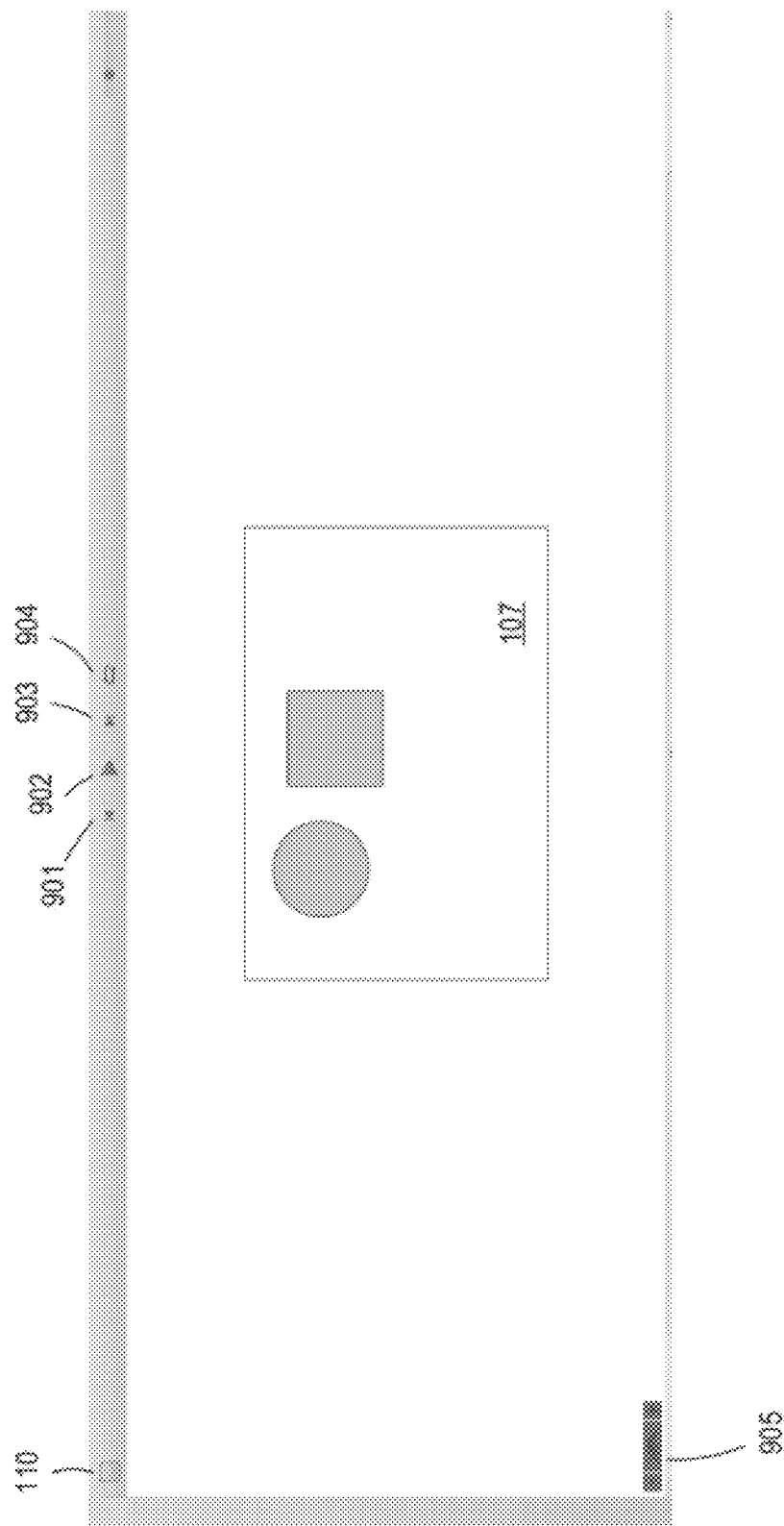
FIG. 9 is a screenshot of an example user interface including a stage area.

FIG. 9 is a screenshot of an example stage portion of the user interface 100 that includes the stage area 107, jump to beginning control 901, play control 902, jump to end control 903, continuous loop control 904, and overflow control 110. Controls 901, 902, 903, 904, and 110 are collectively referred to herein as stage controls 108. The stage area 107 is where the user can see a preview of the style sheet animation as directed by the stage controls 108.

The overflow control 110 enables or disables stage area 107 overflow during the preview. That is, whether animation objects that animate outside of the stage area 107 remain visible or are hidden.

Control 901 jumps the preview to the beginning of the style sheet animation, if the style sheet animation has only one scene, or the beginning of the currently selected scene of the style sheet animation, if the style sheet animation has multiple scenes. Animation scenes are described in greater detail below.

Control 902 plays a preview of the entire style sheet animation or the currently selected scene. While the preview is playing, the control 902 can be activated to stop the currently playing preview. If the preview had not finished when stopped, the preview can be restarted from where it left off by activating the control 902 again.

Control 903 jumps the preview to the end of the entire style sheet animation or the end of the currently selected scene.

When the continuous looping control 904 is enabled, a playing preview will continuously loop until stopped.

The stage portion of the interface also includes zoom control 905 for zooming the display of the stage area 107.

According to some embodiments, animation objects can be selected for further animation object-specific operations in two different ways. In one way, an animation object is selected through the object area 102, for example, by directing input (e.g., click or double-click) to an indicator (e.g., a name) of the animation object listed in the object area 102 tree. In the other way, an animation object is selected by directing input (e.g., click or double-click) to the animation object as displayed in the stage area 107. Animation objects may be selected in other ways and the invention is not limited to any particular way of selecting an animation object for further animation object-specific operations.

In some embodiments, regardless of how the animation object is selected, when the animation object is selected, the animation object as displayed in the stage area 107 is adorned with corner handles that can be used to scale the size and dimensions of the animation object. Additionally, the selected animation object may have a small circle indicating the transform origin for the animation object. Further, a selected animation object indicated as selected by corner handles can be moved in the stage area 107 by clicking and dragging the selected animation object to a new place on the stage area 107.

Figure 10:
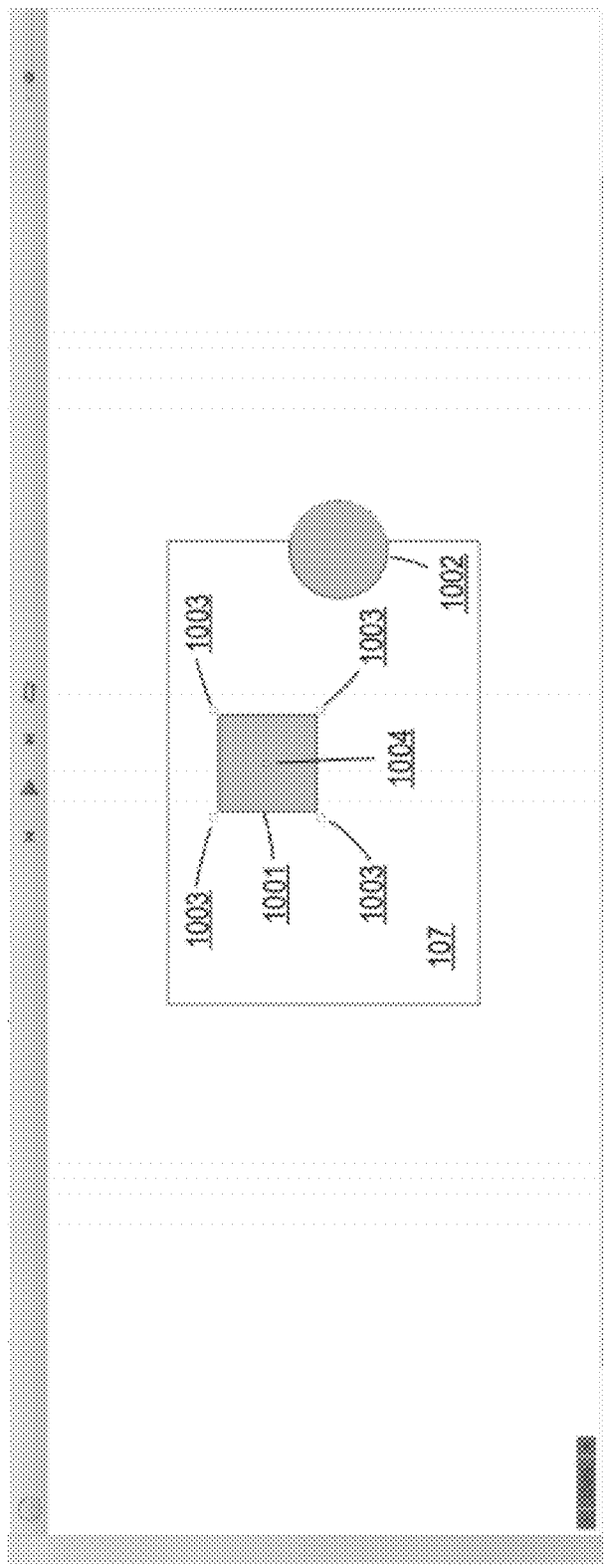
FIG. 10 is a screenshot of an example user interface including a stage area.

For example, in FIG. 10, there are two animation objects 1001 and 1002 on the stage area 107. Animation object 1001 is currently selected as indicated by the corner handles 1003 and the transform origin indicator 1004. In this example, the stage overflow toggle 110 is enabled as indicated by the portion of the animation object 1002 that is visible off the stage area 107.

The Stage Tab

Figure 11:
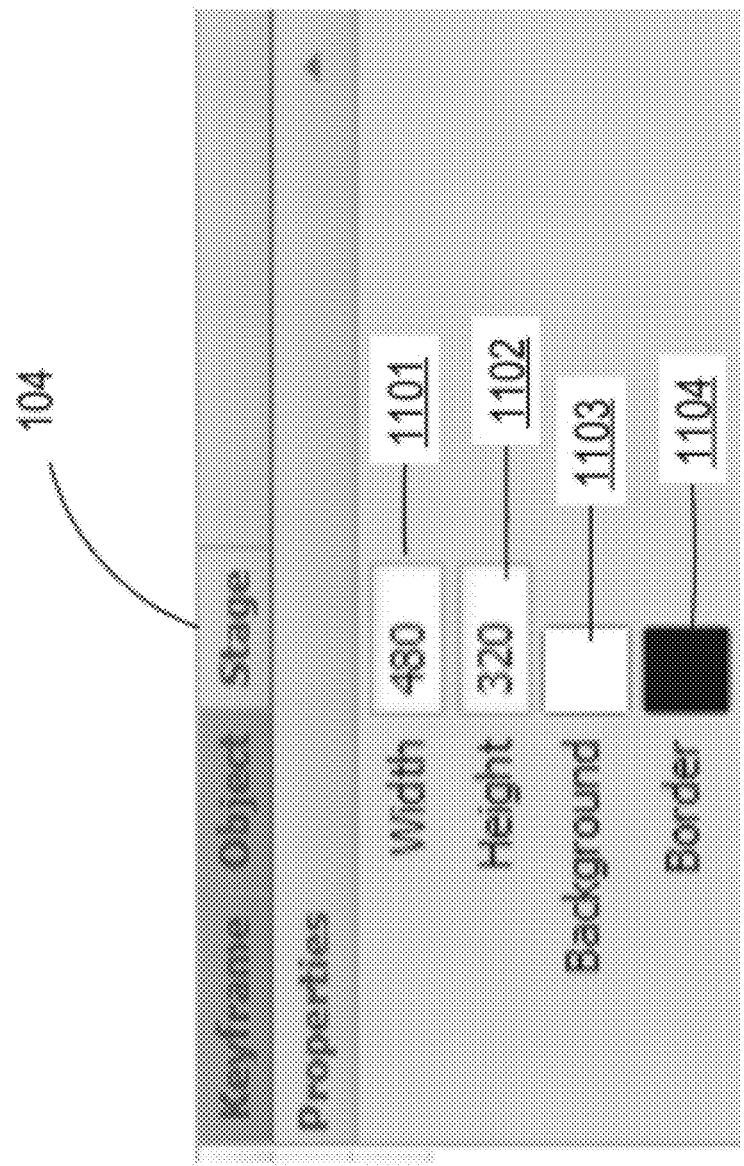
FIG. 11 is a screenshot of an example user interface including a stage tab for configuring a stage area.

FIG. 11 is a screenshot of an example stage tab 104 panel for configuring the stage area 107 and the animation area of the style sheet animation. In particular, the panel allows the user to adjust the size (width and height), background color and border color of the stage area 107 and the animation area. The panel includes a text box 1101 for entering the width in pixels of the stage area 107 and the animation area, a text box 1102 for entering the height in pixels of the stage area 107 and the animation area, a Red-Green-Blue-Alpha color palette selector 1103 for selecting the background color and opacity of the stage area 107 and the animation area, and a RGBA color palette selector 1104 for selecting the border color and opacity of the stage area 107 and the animation area.

In some embodiments, input to the panel is immediately applied to the stage area 107. When the style sheet animation is exported a web page (described in greater detail below), the current settings of the panel are translated to markup language statements (e.g., HTML, XHTML, etc.) and style sheet language statements (e.g., CSS, etc.) representing the animation area according to the current stage tab 104 panel settings. The following are examples of markup language and style sheet language statements that may be generated based on input to the stage tab 104 panel:

```
01: .stage {
02:   width: 480 px;
03:   height: 320 px;
04:   border: 1 px solid rgba(0,0,0,1);
05:   background-color: rgba(255,255,255,1);
06: }
07: <html>
...
08: <div class="stage"> ... </div>
09: ...
10: </html>
```

In the above example, Lines 01-06 are a style sheet rule declared in a style sheet language and based on the current stage tab 104 panel settings show in FIG. 11. Lines 08-09 are markup language statements which, when executed by a web browser, apply the style sheet rule to a HTML division ('<div>') element to cause an animation area to be displayed on a web page that is 480 pixels wide by 320 pixels high having a 1 pixel solid black border and having a solid white background.

The Object Tab

Figure 12A:
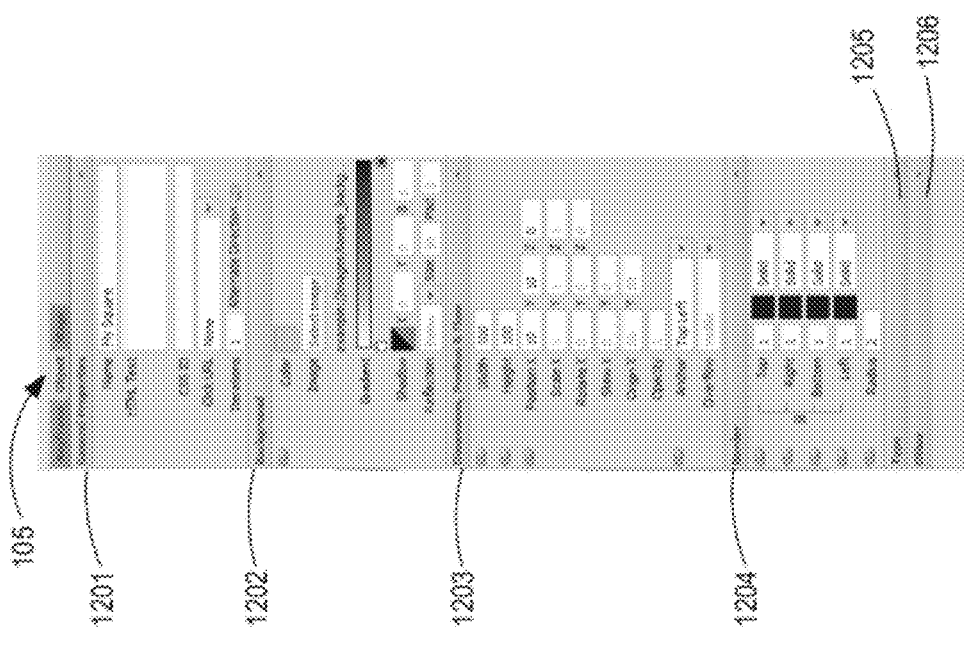
FIG. 12A and FIG. 12B are screenshots of an example user interface including an object tab for configuring a currently selected animation object.
Figure 12B:
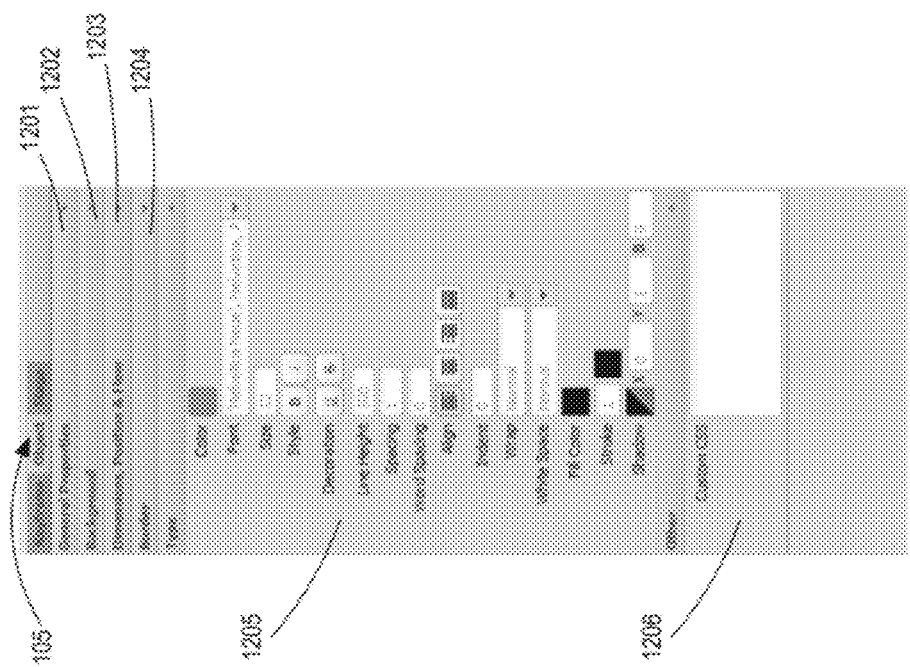

FIGS. 12A and 12B are screenshots of an example object tab 105 for a currently selected animation object. The tab 105 includes six panels 1201-1206. In FIG. 12A, panels 1205 and 1206 are collapsed, and in FIG. 12B, panels 1201-1204 are collapsed.

The object tab 105 allows a user to edit properties of a currently selected animation object. Once the user has added an animation object to the object area 102 tree, the user can edit properties of the animation object in the object tab 105. The edits to the animation object affect not only the animation object as displayed in the stage area 107 but also the final style sheet animation when exported as a web page.

The General Properties Panel

According to some embodiments, the following interactive controls are provided to the user on the general properties panel 1201 of the object tab 105:

Name: Allows the user to specify a name for the animation object.

HTML Text: Allows the user to enter valid HTML to associate with the animation object.

CSS ID: Allows the user to label the animation object with an optional style sheet identifier which can improve the comprehension of the exported web page code and provide a handle to the animation object for any custom code added by the user to exported web page.

Click URL: In one embodiment. allows the user to associate a Uniform Resource Locator (URL) with an animation object such that when a viewer of the animation in a web browser clicks on the animation object, the web browser will either open a new web browsing window directed to the URL or replace the web page running the animation with the web page at the associated URL. In another embodiment, the viewer's click on the animation object causes the animation to jump to a specified "scene" of the animation. Animation scenes are described in greater detail below.

Repeats: Allows the user to specify whether the animation of the animation object plays only once or a specified number of times. If Alternate Direction is also selected, the animation of the animation object will play backwards in alternative repetitions (i.e. during even iterations). Setting the animation of an animation object to repeat may increase the duration of the overall style sheet animation.

Figure 13:
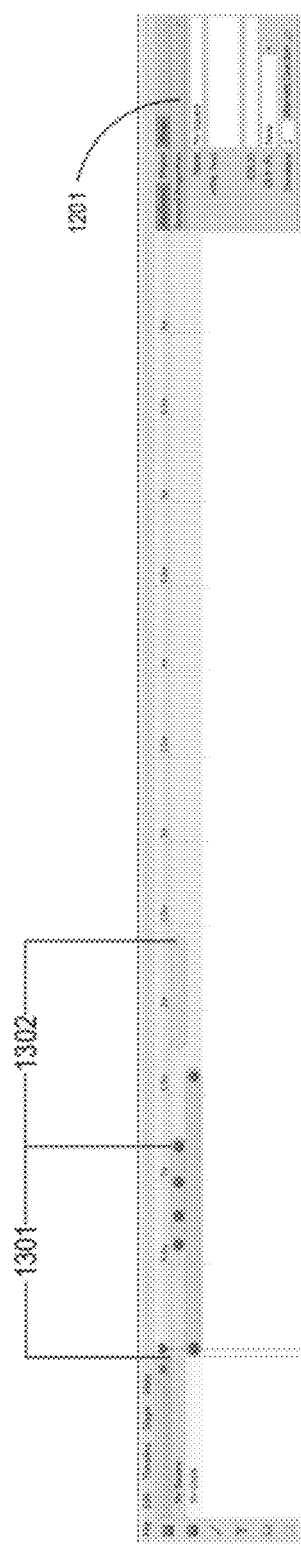
FIG. 13 is a screenshot of an example user interface showing a duplicate keyframe series for an animation object.

In one embodiment, duplicate keyframe series are shown in the animation object's timeline in the timeline area 103 to indicate the repetition. For example, in FIG. 13, the "My Square" animation object is configured to animate for two iterations as indicated in the general properties panel 1201. The first iteration indication 1301 and a second iteration indication 1302 are presented on the timeline for the "My Square" animation object. The second iteration indication 1302 may be automatically displayed on the timeline in response to the user changing the value of the Iterations field on the general properties panel 1201.

In one embodiment, the second and subsequent iteration indications are non-editable by the user and changes made to the animation object with respect to the first iteration indication (e.g., 1301) are automatically reflected in the second and subsequent iteration indications (e.g., 1302).

Figure 14:
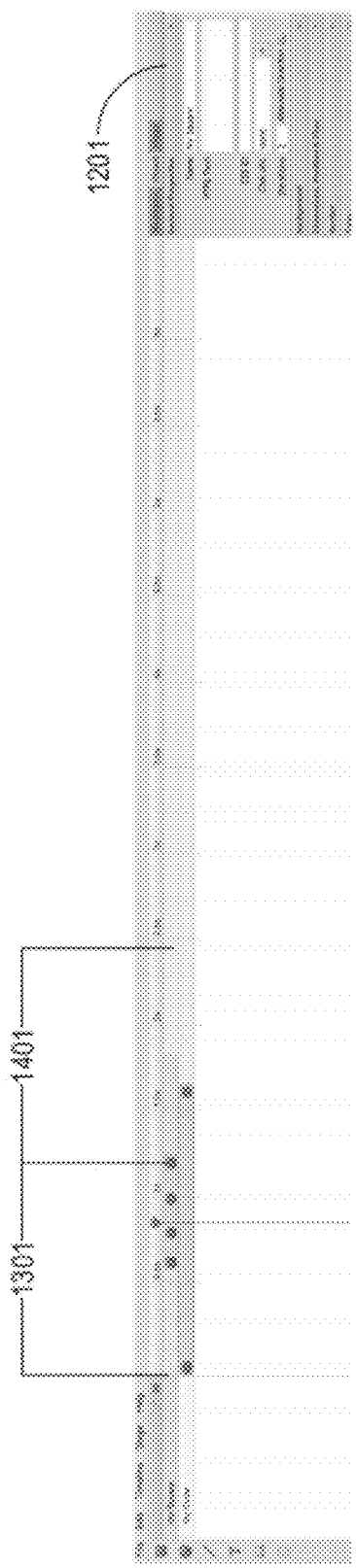
FIG. 14 is a screenshot of an example user interface showing a reversed duplicate keyframe series for an animation object.

FIG. 14 shows the same "My Square" animation object but with the Alternate Direction option selected on the on the general properties panel 1201. In this case, the second iteration indication 1302 from FIG. 13 has been reversed as indication 1401 along the timeline to reflect that the "My Square" animation object, when animated for the second iteration, will be animated in the reverse of the first iteration.

The Background Panel

According to some embodiments, the following interactive controls are provided to the user on the background panel 1202 of the object tab 105 which allows the user to set background properties of a currently selected animation object:

Color: Allows the user to set the background color of the animation object.

Image: Allows the user to specify an image to use as the background.

Gradient: Allows the user to create either a linear or radial gradient background. Several sub-properties may be specified. A new color-stop may be added by directing input to the gradient preview (e.g., click or double-click) or by dragging one of the end color stops. An added color-stop may be removed by dragging it down or up causing the corresponding color-stop icon to disappear. The start and end fields allows the user to control the start and end of the gradient in terms of percentage units. If a radial gradient, the user can also specify a start and end radius.

Shadow: Allows the user to adjust the offset and blur of a shadow of the animation object.

Reflection: Allows the user to select a direction for a background reflection as well as size (in percentage of the animation object) and padding between the animation object and the reflection.

The Dimension, Position, and Flow Panel

According to some embodiments, the following interactive controls are provided to the user on the dimension, position, and flow panel 1203 of the object tab 105:

Height/Width: Allows the user to set the height/width of the animation object in pixels.

Position: Allows the user to specify the number of pixels that the animation object will be displaced.

In one embodiment where the animation object is not a child of a parent animation objection (i.e., it is a top-level animation object), the displacement is relative to a point of the animation area (e.g., the top-left corner of the animation area).

Where the animation object is a child of a parent animation object, the displacement is relative to a point of the parent animation object. In one embodiment, this point is the top-left "content" corner of the parent animation object. The content corner of an animation object is inside the border of the animation object, if the animation object has a border, or the top-left corner of the animation object, if the animation object does not have a border. For example, if an animation object has a 1 pixel width border and its top left corner is at 10 pixels by 10 pixels from the top left corner of the animation area, then the top-left content corner of the parent animation object is 11 pixels by 11 pixels from top-left corner of the animation area.

It should be noted that the 7 position is not the same as the z-index order of the animation object which, as discussed above, may be established by the animation object's relative location in the object area 102 tree. In one embodiment, the Z position has no effect unless the user adds three-dimensional style sheet functionality to the exported web page code.

Scale: Allows the user to scale the animation object. In one embodiment, scaling is performed relative to the transform origin of the animation object. Similar to the position property, the Z setting only has an effect if the user adds custom three-dimensional style sheet functionality to the exported web page code.

Rotate: Allows the user to specify rotation for the animation object. For example, the user can specify rotation settings for rotating the animation object around the Z-axis. In one embodiment, rotation is performed relative to the transform origin which, by default, is the animation object's midpoint.

Skew: Allows the user to specify distortion for the animation object in either the X or Y axis. In one embodiment, skew is performed relative to the transform origin of the animation object. In one embodiment, when the user rotates, scales, or skews a parent animation object, the coordinate system for all descendants of the parent animation object are also rotated, scaled, and skewed. For example, if a child animation object is animated by moving 10 pixels to the right and the parent animation object is subsequently scaled up 1.5 times in size, the child object will now animate 15 pixels to the right because its coordinate system was also scaled up 1.5 times when the parent animation object was scaled up.

Origin: Allows the user to specify the transform origin for the animation object which is the point used as the anchor for scaling, rotation, and skew. In one embodiment, the origin may be specified using numerical values, negative or positive, that represents a percentage of the animation object's base size before any scaling, rotating, or skewing. In one embodiment, the default origin is X=50 and Y=50. In one embodiment, X=0 and Y=0 is the top left of the animation object.

Opacity: Allows the user to specify the opacity for the animation object as a numerical value ranging from 0 to 1 where 0 is invisible and 1 is fully visible.

Anchor: Allows the user to specify where the animation object is anchored to its parent, if the animation object is a child animation object.

Overflow: Allows the user to specify whether the animation object overflow is visible, scrollable or hidden.

The Border, Type, and Custom CSS Panels

The border panel 1204 of the object tab 105 allows the user to control the style, width and color of the animation object's borders. In one embodiment, certain border styles (e.g. double) are only applied once the border width is above a certain threshold. In one embodiment, border properties may be linked or edited separately. When the link icon is locked, all borders are edited if one is edited.

According to some embodiments, the type panel 1205 of the object tab 105 allows the user to control the style of the text within the animation object. In one embodiment, each animation object has a single text style which can be overridden by the user by embedding style information in the exported web page code.

According to some embodiments, the custom style sheet panel 1206 of the object tab 105 allows the user to input additional style sheet properties to apply to the animation object.

The Keyframe Tab

Figure 15:
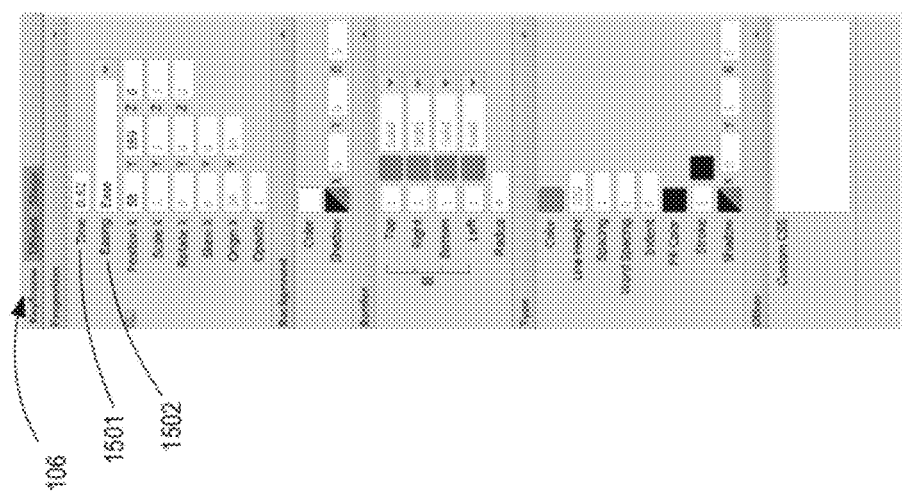
FIG. 15 is a screenshot of an example user interface including a keyframe tab for configuring a currently selected keyframe.

FIG. 15 is a screenshot of an example keyframe tab 106 for configuring a selected keyframe. In the example of FIG. 15, the keyframe tab 106 shown is for the keyframe corresponding to the keyframe indicator 603 of FIG. 6. A user may select a keyframe for configuration through the keyframe tab 106 by directing input (e.g., click or double-click) to the corresponding keyframe indicator displayed in the timeline area 103. Once the user has selected a keyframe indicator representing a keyframe for an animation of an animation object, the user can edit properties of the keyframe in the keyframe tab 106. The edits to the keyframe affect not only the keyframe when used to preview the style sheet animation in the stage area 107 but also the style sheet animation when exported as a web page.

In one embodiment, the keyframe tab 106 includes two keyframe specific properties: time 1501 and easing function 1502.

The specified value of the time 1501 property sets the time of the currently selected keyframe. Typically, this time is specified as a number of seconds since the start of the overall animation which, by convention, typically starts at 0 seconds. Alternatively, the time 1501 property value may be specified as a percentage of the duration of the animation that the keyframe represents.

The easing function 1502 property allows the user to specify how the animation object will transition from the currently selected keyframe to the next keyframe in time in the keyframe series for the animation object. In particular, the easing function 1502 property sets the easing function for the currently selected keyframe. The selected easing function will operate on the duration from the currently selected keyframe to the next keyframe in the keyframe series for the animation object. The selected easing function determines the velocity and the acceleration, if any, of the animation between the two time points of the two keyframes. According to some embodiments, the following types of easing functions are available:

Ease: With this easing function, the animation of the animation object between the two keyframe time points starts with a slow speed, speeds up, and slows down to a stop.

Linear: With this easing function, the animation has a constant speed.

Ease-In: the animation starts a full stop and ends at full speed.

Ease-Out: the animation starts with full speed and ends at a stop.

Ease-In-Out: the animation starts at a stop, speeds up and ends at a stop.

In one embodiment, the user can use a custom easing function editor to specify a custom easing function based on a cubic Bézier curve. An example custom easing function editor is described below.

The remainder of the properties on the tab 106 allows the user to specify values of various "animatable" properties of the animation object at the time of the keyframe as set by the value of the time property 1501. All properties other than the time 1501 and easing function 1502 property shown on the keyframe tab 106 are animatable properties of an animation object. The user can also specify other animatable properties using the Custom style sheet text box.

An animated effect can be achieved over the duration between two consecutive keyframes by specifying different values for an animatable property of the animation object for the two keyframes. As an example, referring to FIG. 8, if the user desired to have the "My Square" animation object animate from a first position at the keyframe corresponding to keyframe indicator 603 to a second position at the keyframe corresponding to keyframe indicator 801, the user could select keyframe indicator 603 and then enter the coordinates of the first position through keyframe tab 106. After doing this, the user could select keyframe indicator 801 and then enter the coordinates of the second position through keyframe tab 106. Alternatively, the user could specify the second position before the first position by selecting keyframe indicator 801 and specifying the coordinates of the second position and then selecting keyframe indicator 603 and specifying the coordinates of the first position. Position is not the only animatable style sheet property and virtually any style sheet property that is able to be animated by a style sheet animator processor (e.g., a web browser) can be configured through the keyframe tab 106. For example, the user can animate opacity, skew, rotation, background color, borders, text, and others.

Custom Easing Function Editor

As mentioned, once the user has selected a keyframe of an animation of an animation object (e.g., by selecting the corresponding keyframe indicator in the timeline area 103), the user can specify an easing function that controls the speed and/or acceleration of the animation between the keyframe corresponding to the selected keyframe and the next keyframe in the keyframe series for the animation object.

In one embodiment, the user is presented with a custom easing function editor that allows the user to specify an easing function using a cubic Bézier curve. Specifying an easing function based on other easing function curves are possible and the invention is not limited to only specifying a custom easing function based on a cubic Bézier curve. For example, an easing function editor based on a step function easing curve may be used.

Figure 16:
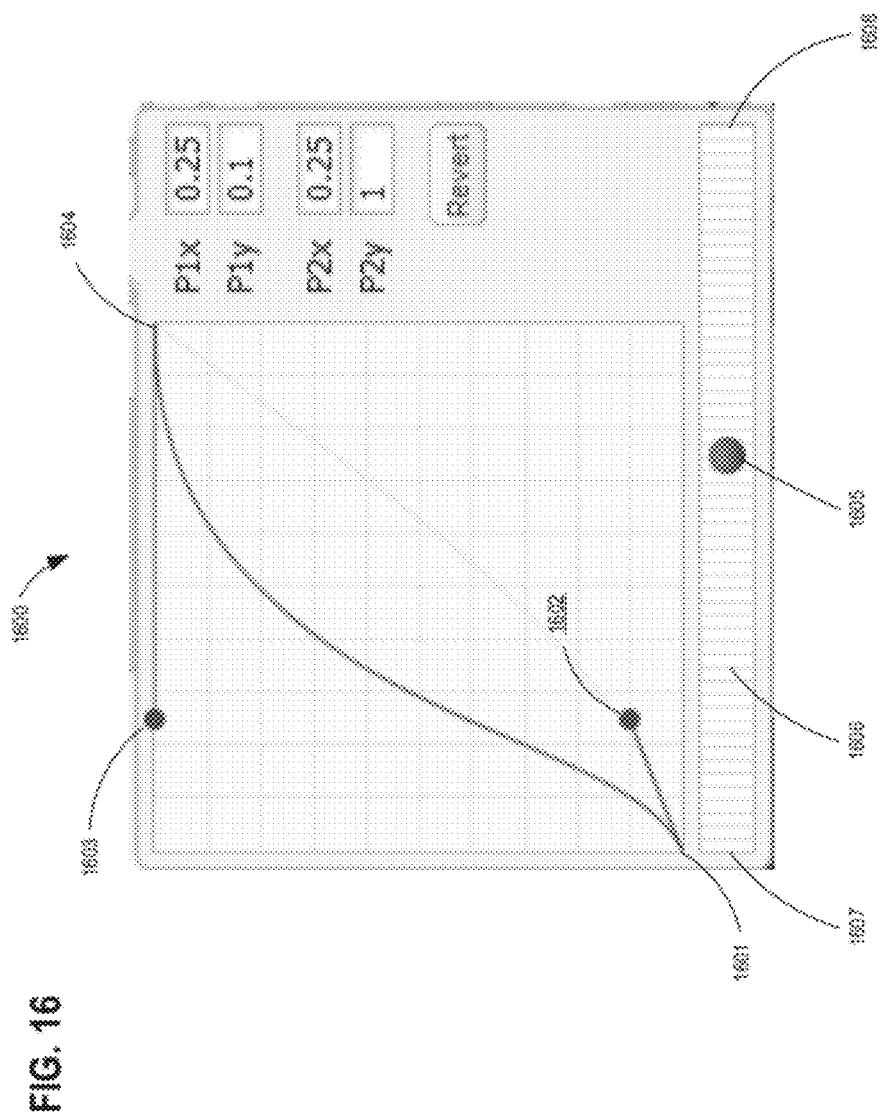
FIG. 16 is a screenshot of an example user interface for configuring an easing function using a cube Bézier curve.

A screenshot of an example custom easing function editor 1600 is shown in FIG. 16. The editor provides four controls points 1601, 1602, 1603, and 1604 that define the easing function, two of which are fixed 1601, 1604 and two of which are adjustable by the user 1602, 1603. The x-axis of the editor represents input to the easing function which is a current elapsed percentage of the animation duration between the two keyframes. The y-axis of the editor represents output of the easing function as a function of its input. The output determines how close the animation is to its final state as defined by the later of the two keyframes. Control point 1601 is fixed at 0, 0. Control point 1604 is fixed at 1, 1. The user can direct input (e.g., click and drag) to either control point 1602 or control point 1603 to move the control points and consequently change the cubic Bézier curve. Alternatively, the user can enter x, y values for the controls points in the text boxes provided by the editor 1600. The text boxes labeled P1x P1y set control point 1602 and the text boxes labeled P2x and P2y set control point 1603. The "Revert" button, when activated, sets control points 1602 and 1603 back to the original x, y values when the editor 1600 was opened.

Animation Speed Simulator

The editor 1600 also provides an animation speed simulator 1605 that helps the user understand how changes to the cubic Bézier curve made using the editor 1600 effect the animation speed between the two keyframes (i.e., the keyframe corresponding to the currently selected keyframe and the next keyframe in the keyframe series for the animation object).

In one embodiment, the simulator 1605 moves from left to right along the track 1606 starting at the left most edge of the track 1607 and moving along the track 1606 until it reaches the right most edge of the track 1608 to complete one movement cycle. When the simulator 1605 reaches the right most edge of the track 1608, the movement of the simulator 1605 is repeated starting again at the left most edge of the track 1607. In one embodiment, this movement repeats continuously as long as the editor 1600 is open. Alternatively, the movement can also be from right to left instead of from left to right.

In one embodiment, a single movement cycle of the simulator 1605 along the track 1606 represents a single iteration of the animation defined by the two keyframes. In particular, the time the simulator 1605 takes to complete one movement cycle (e.g., the time the indicator 1605 takes to move from the left most edge 1607 to the right most edge 1608) corresponds to the time of the single animation iteration. Further, the speed of the simulator 1605 is controlled by the currently selected cubic Bézier curve in the editor 1600. Thus, the simulator 1605 provides a convenient way for the user to get a sense of the speed of the animation between the two keyframes.

As an example, referring to FIG. 8, if editing the easing function for the keyframe corresponding to keyframe indicator 601 using the editor 1600, then the movement cycle of the simulator 1605 would be approximately 1.6 seconds. During a movement cycle, the simulator 1605, as controlled by the current cubic Bézier curve shown in FIG. 16, would start out from the left edge 1607 with a slow speed, then speed up, and then slow down to a stop as it nears the right edge 1608.

Animation Scenes

According to some embodiments, the user can interact with interface 100 to chain individual animations together to create a longer animation. These individual animations are referred to in this section as "scenes". In one embodiment, the interface 100 provides a scene manager 109.

Figure 17:
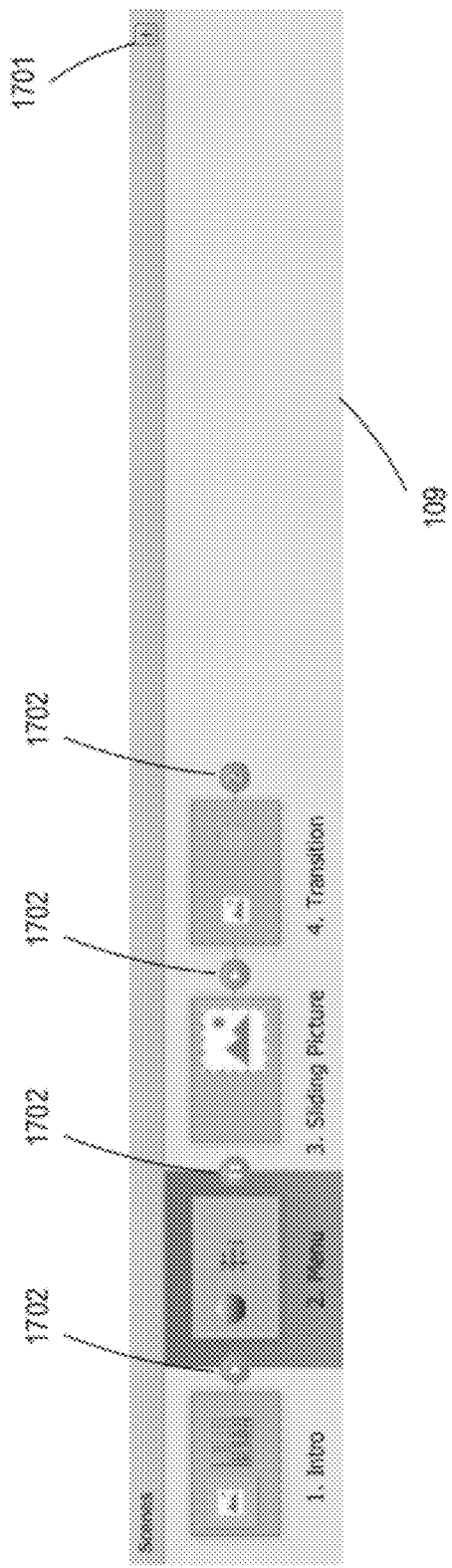
FIG. 17 is a screenshot of an example user interface including a scene manager for chaining individual style sheet animations together to create a longer style sheet animation.

FIG. 17 is a screenshot of an example user interface that includes a scene manager 109. The scene manager 109 includes a thumbnail image of each scene of the current style sheet animation. In one embodiment, if input is directed to the thumbnail image (e.g., mouse hover), the currently defined animation of the corresponding scene is played in the thumbnail area. The user can load a scene for editing using the timeline-based techniques described above by directing input (e.g., clicking or double-clicking) to the scene in the scene manager 109 area of the interface 100. The user can reorder a scene by directing input (e.g., clicking, dragging, and dropping) to a scene in the scene manager 109 area and moving it to the desired position amongst the scenes listed in the scene manager 109. A new scene can be added by directing input (e.g., clicking) to the plus icon 1701. Alternatively, a new scene can be added by directing input (e.g., clicking) to a current scene listed in the scene manager 109 and invoking a duplicate action (e.g., from a drop-down menu) to create a duplicate of the selected scene. Each scene listed in the scene manager 109 is associated with an interactive transition icon 1702 that controls how the overall style sheet animation transitions between scenes. In one embodiment, three transition options are available:

Jump to Next Scene: With this option, when the current scene is finished, the style sheet animation automatically transitions to the next scene.

Pause: With this option, when the current scene is finished, the style sheet animation is paused until further action is taken by the viewer of the animation. For example, the animation of the paused scene may include an interactive animation object that is configured with a Click URL as described above.

Jump to Specific Scene: With this option, when the current scene is finished, the style sheet animation automatically transitions to a specified scene.

For example, in the scene configuration of FIG. 17, Scene 1 ("Intro") will transition to Scene 2 ("Menu") when finished. When Scene 2 is finished, the animation will pause until the viewer takes further action. In this example, assume Scene 2 is configured with a Click URL which, when activated, transitions the animation to Scene 3 ("Sliding Picture"). When Scene 4 ("Transition") is finished, the animation will transition back to Scene 2.

Exporting the Style Sheet Animation as a Web Page

Once the user has created and configured a style sheet animation as desired using one or more of the timeline-based user interface techniques described herein, the user can export the style sheet animation as a web page. In particular, the style sheet animation creation tool automatically generates scripting language text (e.g., Javascript, etc.), markup language text (e.g., HTML, XHTML, etc.), and/or style sheet language text (e.g., CSS, etc.) in response to a user command (e.g., selection from a drop-down menu). In one embodiment, the text that is generated can be processed by any style sheet animation processor capable of processing the text to animate the style sheet animation. For example, the style sheet animation processor may be a web browser or other type of style sheet animation processor having a web rendering or layout engine that is capable of processing the text to animate the style sheet animation. The generated text, when processed by a style sheet animation processor, causes the style sheet animation to be displayed to a viewer of the web page.

In one embodiment, the generated text is exported as one or more files which can be served by a web server to a style sheet animation processor or loaded by a style sheet animation processor from a file system storing the files. In one embodiment, the generated text is presented in a user interface window where it can be viewed and/or edited by the user.

Sample Device

Figure 18:
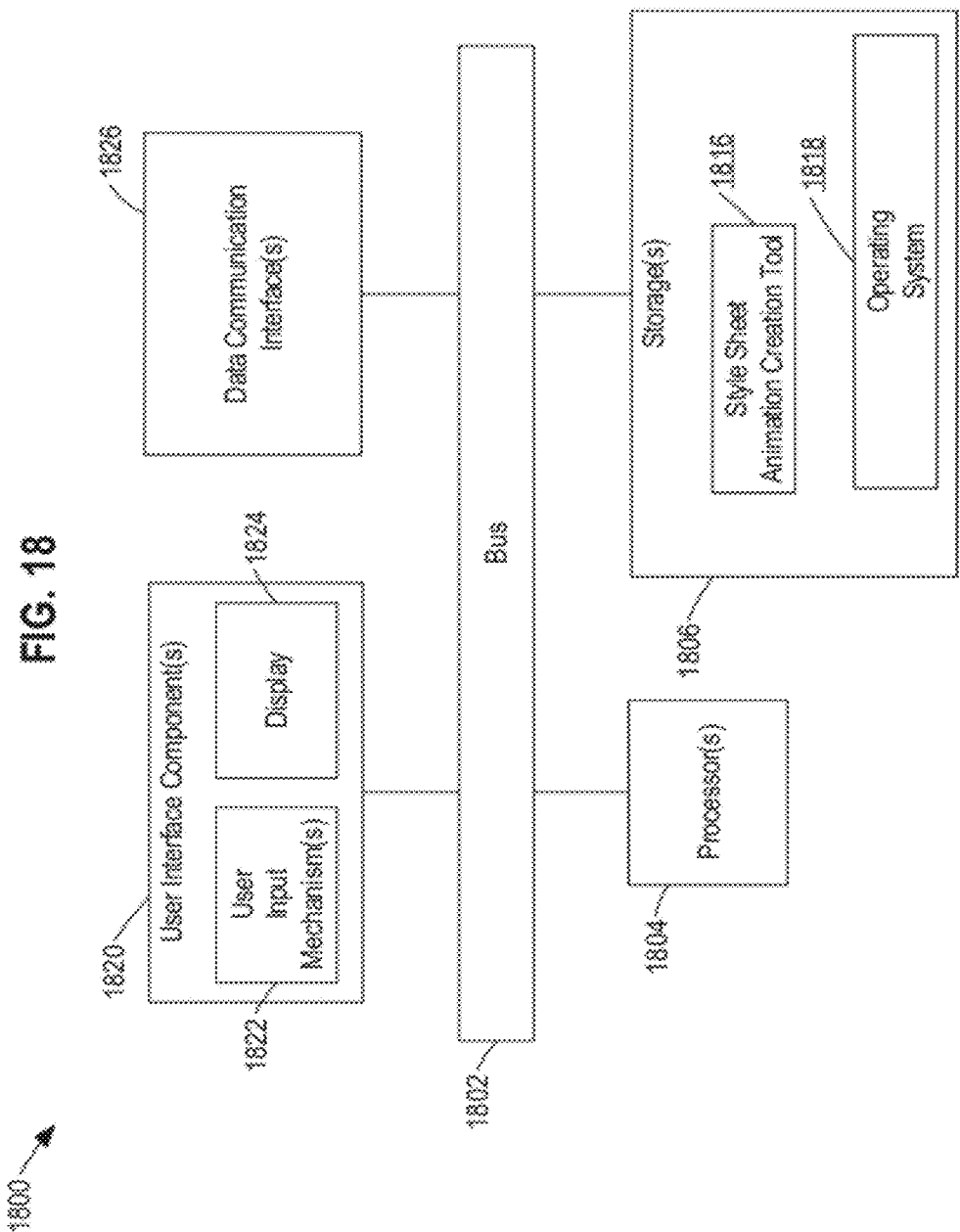
FIG. 18 is a block diagram of a sample device in which some embodiments of the present invention may be implemented.

According to some embodiments of the invention, the techniques and user interfaces described herein are facilitated by a style sheet animation creation device. FIG. 18 is a block diagram showing various components of the style sheet animation creation device generally designated as 1800. Physically, these components can be located in a user's personal computing device such as a desktop computer, a laptop computer, a tablet computer, a smart phone, etc.

A bus 1802 facilitates information exchange between components connected to the bus 1802. One or more processors 1804 coupled to the bus 1802 execute instructions and process information. One or more storages 1806 (also referred to herein as non-transitory computer-readable media) are coupled to the bus 1802. Storage(s) 1806 may be used to store executable programs (e.g., binaries, bytecode, scripts, etc.), permanent data (e.g. markup language documents, web browser style sheets, web page code, associated metadata, etc.), temporary data that is generated during program execution (e.g., data structures representing keyframes, keyframe series, animation objects, etc.), and any other information needed to carry out computer processing.

Storage(s) 1806 may include any and all types of storages that may be used to carry out computer processing. For example, storage(s) 1806 may include main memory (e.g. random access memory (RAM) or other dynamic storage device), cache memory, read only memory (ROM), permanent storage (e.g. one or more magnetic disks or optical disks, flash storage, etc.), as well as other types of storage including external storage (e.g., network attached storage (NAS), direct-attached storage (DAS), storage area network (SAN), etc.) coupled to the device 1800 via data communication interface(s) 1826. The various storages 1806 may be volatile or non-volatile. Common forms of non-transitory computer-readable media include, for example, a floppy disk, a flexible disk, hard disk, magnetic tape, or any other magnetic medium, a CD-ROM, DVD, or any other optical storage medium, punchcards, papertape, or any other physical medium with patterns of holes, a RAM, a PROM, an EPROM, a FLASH-EPROM or any other type of flash memory, any memory chip or cartridge, and any other storage medium from which a computer can read.

Storage(s) 1806 store several sets of executable instructions, including an operating system 1818 and a style sheet animation creation tool 1816. The processor(s) 1804 execute the operating system 1818 to provide a platform on which other sets of software may operate, and execute the style sheet animation creation tool 1816 to provide additional, specific functionality described in greater detail below.

In some embodiments of the invention, the tool 1816 and the operating system 1818 cooperate to implement the techniques described herein. That is, portions of the techniques may be performed by the tool 1816 and portions may be performed by the operating system 1818. It should be noted though that this is just one possible embodiment. As an alternative, all of the techniques may be performed by the operating system 1818. As a further alternative, all of the techniques may be performed by the tool 1816. All such possible implementations are within the scope of the present invention.

In the embodiment shown in FIG. 18, the processor(s) 1804 and the executable instructions 1816 and/or 1818 may be thought of as forming a style sheet animation creator that implements the techniques and user interfaces shown and described herein. In such an implementation, the processors(s) 1804 may be thought of as being "configured" by the executable instructions 1816 and/or 1818 to carry out the techniques and drive the user interfaces. This is just one possible implementation for the style sheet animation creator.

As an alternative, the style sheet animation creator may be hardware implemented using a device (e.g. a programmable logic array) having an array of elements, including logic elements, wherein the elements are programmed or configured to implement the techniques and user interfaces shown and described herein. As a further alternative, the style sheet animation creator may be hardware implemented by way of another device such as an application specific integrated circuit (ASIC) having elements, including logic elements, that are constructed/configured to implement the techniques and user interface shown and described herein. Overall, the style sheet animation creator may be hardware implemented using any number of devices with elements, including logic elements, that are constructed/configured to implement the techniques and user interfaces shown and described herein. These and other implementations of the style sheet animation creator are possible. All such implementations are within the scope of the present invention.

The device 1800 further comprises one or more user interface components 1820 coupled to the bus 1802. These components 1820 enable the device 1820 to receive input from and provide output to a user. On the input side, the user interface components 1820 may include input mechanism(s) 1822, for example, a keyboard/keypad having alphanumeric keys, a cursor control device (e.g. mouse, trackball, touchpad, etc.), a touch sensitive screen capable of receiving user input, a microphone for receiving audio input, etc. On the output side, the components 1820 may include a graphical interface (e.g. a graphics card) and an audio interface (e.g. sound card) for providing visual and audio content. The user interface components 1820 may further include a display 1824 (in some embodiments, the display 1822 is a touch sensitive display) for presenting visual content. In some embodiments, the style sheet animation creator executed by the processor(s) 1804 may provide the user interfaces shown and described herein that take advantage of and interacts with the user interface components 1820 to receive input from and provide output to a user. The user interfaces may also interact with a touch sensitive display to receive information indicating which location(s) of the touch sensitive display is being touched by the user and to translate this information into input that the style sheet animation creator can use (e.g. to determine which menus are selected, which soft buttons are depressed, etc). These and other functions may be performed by the user interfaces provided by the style sheet animation creator.

In addition to the components set forth above, the device 1800 may further comprise one or more data communication interfaces 1826 coupled to the bus 1802. These interfaces 1826 enable the device 1800 to communicate with other components. The communication interfaces 1826 may include, for example, a network interface (wired or wireless) for enabling the device 1800 to send messages to and receive messages from a data network such as, for example, a Local Area Network (LAN). The communications interfaces 1826 may also include a 3G or 4G interface for enabling the device 1800 to access the Internet without using a local network. The communication interfaces 1826 may further include a telephone network interface for enabling the device 1800 to conduct telephone communications. The communication interfaces 1826 may further include a wireless interface (e.g. Bluetooth) for communicating wirelessly with nearby devices, such as wireless headsets, earpieces, etc. The communication interfaces 1826 may further comprise a jack for interfacing with a set of wired headphones, headsets, earphones, etc. These and other interfaces may be included in the device 1800.

Extensions and Alternatives

In the foregoing specification, embodiments of the present invention have been described with reference to numerous specific details that may vary from implementation to implementation. Thus, the sole and exclusive indicator of what is the invention, and is intended by Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Example Markup Language and Style Sheet Language Text

Provided below is example scripting language text (Lines 007-0053, 056-069), markup language text (Lines 001-006, 054, 055, 061, 062, 146-157) and style sheet language text (Lines 063-145) representing a style sheet animation and automatically generated by the style sheet animation tool based on user input to one or more of the user interfaces described above. This example text can be processed by a CCS3 animation capable and WebKit enabled style sheet animation processor to produce the animation. However, it should be understood that the invention is not limited to CSS3 animations and not limited to generating style sheet animations for WebKit enabled style sheet animation processors.

In the example animation, an initially opaque yellow circle (Lines 110-122, 152) gradually becomes completely transparent (less opaque) over a duration of three seconds (Line 134). There are two keyframes declared in a style sheet language at Lines 124-133. At the first keyframe, the circle starts the animation fully opaque (Line 126). At the second keyframe, the circle ends the animation fully transparent (Line 131). The speed at which the circle becomes transparent between the two keyframes is controlled by the cubic Bézier curve where P1x=0.25, P1y=0.1, P2x=0.25, P2y=1 (Line 127). A 480 pixel by 320 pixel animation area is declared at Lines 104-109 and Line 151. The scripting language text at Lines 007-0053 and Lines 056-069 implements animation scene functionality and starts the animation when the web page window is loaded.

```
001: <!DOCTYPE html>
002: <html>
003: <head>
004: <meta http-equiv="Content-Type" content="text/html; charset=utf-8">
005: <title>MyProject · Made with Sencha Animator</title>
006: <script type="text/javascript">
007: function setConfig(configObject) {
008: config=configObject;
009: var ol=document.body.getElementsByTagName('ol')[0];
010: scenes=ol.children;
011: currentSceneIndex=-1;
012: }
013: function start( ) {
014: goToScene(0);
015: }
016: function goToSceneID(id) {
017: for (var i=0; i<config.length; i++) {
018: if (config[i].id===id) {
019: goToScene(i);
020: return;
```

```
021: }
022: }
023: }
024: function goToScene(index) {
025: startScene(index);
026: if (config[index].jump !==−1) {
027: applyTimeout(config[index].jump, config[index].duration);
028: }
029: }
030: function startScene(index) {
031: if (index===currentSceneIndex) {
032: scenes[index].setAttribute('class','run restart');
033: setTimeout(function( ){
034: scenes[index].setAttribute('class','run');
035: },0);
036: return;
037: }
038: var scene;
039: for (var i=0; i<scenes.length; i++) {
040: scene=scenes[i];
041: if (i===index) {
042: scene.setAttribute('class','run');
043: } else {
044: scene. setAttribute('class','');
045: }
046: }
047: currentSceneIndex=index;
048: }
049: function applyTimeout(index,time) {
050: setTimeout(function( ){
051: goToScene(index);
052: },time);
053: }
054: </script>
055: <script type="text/javascript">
056: window.onload=setup;
057: function setup( ){
058: setConfig([{"jump":−1,"duration":3250,"id":0}]);
059: start( );
060: }
061: </script>
062: <style type="text/css">
063: .AN-sObj-stage {
064: border: 1 px solid #000;
065: position: relative;
066: overflow:hidden;
067: -webkit-perspective: 600;
068: -webkit-transform-style:preserve-3d;
069: }
070: .AN-sObj-stage div {
071: position: absolute;
072: }
073: .AN-sObj-stage a {
074: color: inherit;
075: text-decoration:none;
076: }
077: .AN-sObj-stage * {
078: margin:0;
079: padding:0;
080: -webkit-font-smoothing: antialiased;
081: }
082: body,.AN-sObj-stage,ol,li {
083: margin:0;
084: padding:0;
085: }
086: ol {
087: list-style:none;
088: position:relative;
089: }
090: li {
091: position:absolute;
092: top:0;
093: left:0;
094: }
095: li {
096: display:none;
097: }
098: li.run {
099: display:block;
100: }
101: .restart * {
102: -webkit-animation-name: none !important;
103: }
104: .AN-sObj-stage{
105: width: 480 px;
106: height: 320 px;
107: border: 1 px solid rgba(0,0,0,1);
108: background-color: rgba(255,255,255,1);
109: }
110: #AN-sObj-1202{
111: -webkit-transform: translate3d(66 px, 29 px, 0 px);
112: width: 100 px;
113: height: 100 px;
114: border-top: 1 px solid rgba(1,14,13,1);
115: border-right: 1 px solid rgba(1,14,13,1);
116: border-bottom: 1 px solid rgba(1,14,13,1);
117: border-left: 1 px solid rgba(1,14,13,1);
118: -webkit-border-radius: 50 px;
119: background-color: rgba(255,255,0,1);
120: top:0;
121: left:0;
122: }
123: @-webkit-keyframes AN-ani-1203 {
124: 0% {
125: -webkit-transform: translate3d(66 px, 29 px, 0 px);
126: opacity: 1;
127:     -webkit-animation-timing-function:cubic-bezier(0.25,0.1,0.25, 1);
128: }
129: 100% {
130: -webkit-transform: translate3d(66 px, 29 px, 0 px);
131: opacity: 0;
132: -webkit-animation-timing-function:ease;
133: }
134: }
135: .run #AN-sObj-1202 {
136: -webkit-animation-name: AN-ani-1203;
137: -webkit-animation-duration: 3 s;
138: -webkit-animation-delay: 0 s;
139: -webkit-animation-fill-mode: both;
140: }
141: .restart #AN-sObj-1202 {
142: -webkit-transform: translate3d(66 px, 29 px, 0 px);
143: opacity: 1;
144:     -webkit-animation-timing-function:cubic-bezier(0.25,0.1,0.25, 1);
145: }
146: </style>
147: </head>
148: <body>
149: <ol>
150: <li id="scene-0">
151: <div class="AN-sObj-stage" id="ext-gen2208">
```

152: <div id="AN-sObj-1202"></div>
153: </div>
154: </li>
155: </ol>
156: </body>
157: </html>

What is claimed is:

1. A method comprising:
displaying a first timeline for a first animation object;
displaying a second timeline for a second animation object;
displaying a first identifier of the first animation object in association with the first timeline;
displaying a second identifier of the second animation object in association with the second timeline;
wherein the first identifier and the second identifier are displayed with respect to each other in an order that determines a z-index order of the first animation object with respect to the second animation object in a style sheet animation of at least the first animation object and the second animation object;
generating style sheet language text which, when processed by a style sheet animation processor, causes the first animation object and the second animation object to be animated in the style sheet animation in accordance with the determined z-index order;
wherein the method is performed by a computing device.

2. The method of claim 1, the method further comprising:
in response to obtaining first input indicating a first point along the first timeline, displaying a first keyframe indicator on the first timeline at the first point;
wherein the first keyframe indicator represents a first keyframe of the style sheet animation;
wherein the first point corresponds to a first time during the style sheet animation;
in response to obtaining second input indicating a second point along the first timeline, displaying a second keyframe indicator on the first timeline at the second point;
wherein the second keyframe indicator represents a second keyframe of the style sheet animation;
wherein the second point corresponds to a second time during the style sheet animation;
wherein generating the style sheet language text further comprises generating style sheet language text that declares the first and second keyframes and that reflects an association between the first keyframe and the first time and an association between the second keyframe and the second time.

3. The method of claim 2, wherein the method further comprises:
in response to obtaining third input indicating a third point along the first timeline, displaying a third keyframe indicator on the first timeline at a third point;
wherein the third keyframe indicator represents a third keyframe of the style sheet animation;
wherein the third point corresponds to a third time during the style sheet animation;
generating style sheet language text that declares the third keyframe and reflects an association between the third keyframe and the third time.

4. The method of claim 2, further comprising:
in response to obtaining the first input, associating the first keyframe with a default easing function.

5. The method of claim 4, wherein the default easing function is one of ease, linear, ease-in, ease-out, or ease-in-out.

6. The method of claim 4, wherein associating the first keyframe with a default easing function includes associating data that represents the first keyframe with four values that define a cubic Bézier curve.

7. The method of claim 2, wherein the first and second input are caused by a user.

8. The method of claim 2, wherein the first keyframe indicator is interactive, the method further comprising:
in response to input directed to the first keyframe indicator, displaying a panel that at least allows a user to specify a time and an easing function to associate with the first keyframe.

9. The method of claim 1, wherein the style sheet language is a Cascading Style Sheets (CSS)-based language.

10. The method of claim 1, wherein displaying the first identifier in association with the first timeline includes displaying the first identifier and the first timeline in a first row; and wherein displaying the second identifier in association with the second timeline includes displaying the second identifier and the second timeline in a second row.

11. The method of claim 10, wherein the first row is displayed closer to an edge of a display than the second row to reflect that the first animation object has a higher z-index order than the second animation object.

12. The method of claim 1, wherein the style sheet animation processor is a web browser.

13. The method of claim 2, further comprising:
displaying an interactive cubic Bézier curve editor with an animation speed simulator.

14. The method of claim 13, wherein the animation speed simulator visibly simulates a speed of the style sheet animation of the first animation object from the first keyframe to the second keyframe.

15. One or more non-transitory computer-readable media storing one or more sequences of instructions which, when executed by one or more processors, cause a computing device to perform a method comprising:
displaying a first timeline for a first animation object;
displaying a second timeline for a second animation object;
displaying a first identifier of the first animation object in association with the first timeline;
displaying a second identifier of the second animation object in association with the second timeline;
wherein the first identifier and the second identifier are displayed with respect to each other in an order that determines a z-index order of the first animation object with respect to the second animation object in a style sheet animation of at least the first animation object and the second animation object;
generating style sheet language text which, when processed by a style sheet animation processor, causes the first animation object and the second animation object to be animated in the style sheet animation in accordance with the determined z-index order.

16. The one or more non-transitory computer-readable media of claim 15, the method further comprising:
in response to obtaining first input indicating a first point along the first timeline, displaying a first keyframe indicator on the first timeline at the first point;
wherein the first keyframe indicator represents a first keyframe of the style sheet animation;
wherein the first point corresponds to a first time during the style sheet animation;
in response to obtaining second input indicating a second point along the first timeline, displaying a second keyframe indicator on the first timeline at the second point;

wherein the second keyframe indicator represents a second keyframe of the style sheet animation;

wherein the second point corresponds to a second time during the style sheet animation;

wherein generating the style sheet language text further comprises generating style sheet language text that declares the first and second keyframes and that reflects an association between the first keyframe and the first time and an association between the second keyframe and the second time.

17. The one or more non-transitory computer-readable media of claim 16, wherein the method further comprises:

in response to obtaining third input indicating a third point along the first timeline, displaying a third keyframe indicator on the first timeline at a third point;

wherein the third keyframe indicator represents a third keyframe of the style sheet animation;

wherein the third point corresponds to a third time during the sheet animation;

generating style sheet language text that declares the third keyframe and reflects an association between the third keyframe and the third time.

18. The one or more non-transitory computer-readable media of claim 16, the method further comprising:

in response to obtaining the first input, associating the first keyframe with a default easing function.

19. The one or more non-transitory computer-readable media of claim 18, wherein the default easing function is one of ease, linear, ease-in, ease-out, or ease-in-out.

20. The one or more non-transitory computer-readable media of claim 18, wherein associating the first keyframe with a default easing function includes associating data that represents the first keyframe with four values that define a cubic Bézier curve.

21. The one or more non-transitory computer-readable media of claim 16, wherein the first keyframe indicator is interactive, the method further comprising:

in response to input directed to the first keyframe indicator, displaying a panel that at least allows a user to specify a time and an easing function to associate with the first keyframe.

22. The one or more non-transitory computer-readable media of claim 15, wherein displaying the first identifier in association with the first timeline includes displaying the first identifier and the first timeline in a first row; and wherein displaying the second identifier in association with the second timeline includes displaying the second identifier and the second timeline in a second row.

23. The one or more non-transitory computer-readable media of claim 22, wherein the first row is displayed closer to an edge of a display than the second row to reflect that the first animation object has a higher z-index order than the second animation object.

24. The one or more non-transitory computer-readable media of claim 15, wherein the style sheet animation processor is a web browser.

25. The one or more non-transitory computer-readable media of claim 16, the method further comprising:

displaying an interactive cubic Bézier curve editor with an animation speed simulator.

26. The one or more non-transitory computer-readable media of claim 25, wherein the animation speed simulator visibly simulates a speed of the style sheet animation of the first animation object from the first keyframe to the second keyframe.

* * * * *